United States Patent
Ticu et al.

(10) Patent No.: US 11,648,824 B1
(45) Date of Patent: May 16, 2023

(54) VENTILATION SYSTEM

(71) Applicant: Ultra Manufacturing Limited, Kitchener (CA)

(72) Inventors: Marian Ticu, Kitchener (CA); Jason Fraser, Kitchener (CA); Nikola Jovicic, Kitchener (CA)

(73) Assignee: Ultra Manufacturing Limited, Kitchener (CA)

( * ) Notice: Subject to any disclaimer, the term of this patent is extended or adjusted under 35 U.S.C. 154(b) by 220 days.

(21) Appl. No.: 17/224,266

(22) Filed: Apr. 7, 2021

(51) Int. Cl.
    *B60H 1/34*     (2006.01)

(52) U.S. Cl.
    CPC ... *B60H 1/3421* (2013.01); *B60H 2001/3478* (2013.01)

(58) Field of Classification Search
    CPC ............... B60H 2001/3478; B60H 1/3421
    See application file for complete search history.

(56) References Cited

U.S. PATENT DOCUMENTS

| | | | |
|---|---|---|---|
| 8,662,970 B2 | 3/2014 | Nagasaka et al. | |
| 9,163,848 B2 | 10/2015 | Doll et al. | |
| 9,513,027 B2 | 12/2016 | Londiche et al. | |
| 9,963,015 B1 | 5/2018 | Fraser et al. | |
| 10,408,490 B2 | 9/2019 | Londiche et al. | |
| 10,464,397 B2 | 11/2019 | Castiglioni et al. | |
| 2002/0004368 A1* | 1/2002 | Denk | F24F 13/1426 251/308 |
| 2019/0270363 A1 | 9/2019 | Hoerschler et al. | |
| 2021/0094392 A1 | 4/2021 | Munoz et al. | |

FOREIGN PATENT DOCUMENTS

| | | | | |
|---|---|---|---|---|
| DE | 102017113906 A1 * | 8/2017 | ........... | B60H 1/3414 |
| DE | 102019206739 A1 * | 11/2020 | | |

OTHER PUBLICATIONS

Volker, DE-102019206739-A1 translation (Year: 2020).*

* cited by examiner

*Primary Examiner* — Steven S Anderson, II

(57) ABSTRACT

A ventilation system including a housing into which a volume of air is directed in an initial air flow direction. The ventilation system includes an air flow guide extending between a base portion and a tip thereof. The air flow guide is movable between a first position, in which the tip is located at a predetermined first minimum distance from an inlet portion wall, and a second position, in which the tip is located at a predetermined second minimum distance from the inlet portion wall, to partially guide the air flowing into the housing into a first channel and a second channel respectively. The ventilation system includes a number of cross-car vanes that are movable together to direct air flowing through the housing in a selected direction relative to the initial air flow direction.

9 Claims, 27 Drawing Sheets

VENTILATION SYSTEM

FIELD OF THE INVENTION

The present invention is a ventilation system for directing air into an enclosed space.

BACKGROUND OF THE INVENTION

There are many known arrangements for directing a flow of air, whether heated or cooled, into enclosed spaces, such as passenger compartments in vehicles. The prior art air vent receives the air directed into it at one or more inlets, and the air exits the air vent at one or more outlets. Typically, the prior art arrangements often include vanes for guiding the air exiting the air vent over a range of positions that are generally transverse relative to the vertical.

The known air vents have various disadvantages. For example, the vanes are often located at the one or more outlets, and this may be undesirable, e.g., because the vanes are unsightly in the context of the interior panels of the passenger compartment, or because dust and dirt may collect at the vanes.

Air vents are typically designed to provide an appearance, at the outlets, that is appealing, and consistent with the other features of the interior of the automobile. However, air vents that meet aesthetic criteria often are not functionally optimal.

SUMMARY OF THE INVENTION

For the foregoing reasons, there is a need for a ventilation system and method that overcomes or mitigates one or more of the disadvantages or defects of the prior art.

In its broad aspect, the invention provides a ventilation system into which a volume of air is directed in an initial air flow direction. The ventilation system includes an air flow guide extending between a base portion and a tip thereof. The air flow guide is movable between a first position, in which the tip is located at a predetermined first minimum distance from an inlet portion wall, and a second position, in which the tip is located at a predetermined second distance from the inlet portion wall, to partially guide the air flowing into the housing into a first channel and a second channel respectively. The ventilation system includes a number of cross-car vanes that are movable together to direct air flowing through the housing in a selected direction relative to the initial air flow direction.

BRIEF DESCRIPTION OF THE DRAWINGS

The invention will be better understood with reference to the attached drawings, in which:

FIG. 2I is the second side view of FIG. 2H with the front cover element of the ventilation system omitted, to show a control element of the air flow guide control assembly;

DETAILED DESCRIPTION

Figure 1A:
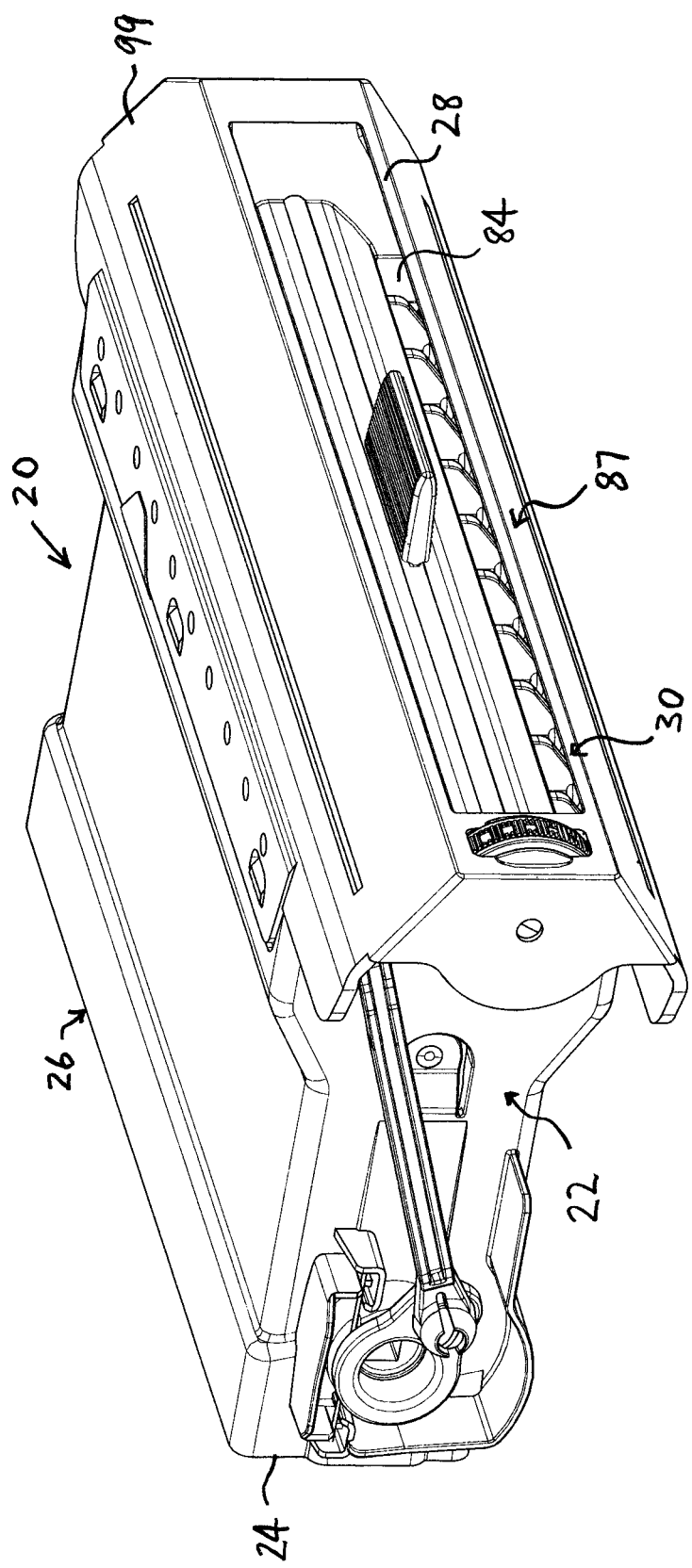
FIG. 1A is an isometric view of an embodiment of a ventilation system of the invention.

In the attached drawings, like reference numerals designate corresponding elements throughout. Reference is made to FIGS. 1A-8 to describe an embodiment of a ventilation system in accordance with the invention indicated generally by the numeral 20. In one embodiment, the ventilation system 20 preferably includes a housing 22 extending between an inlet end 24 at a rear side 26 of the housing 22, into which a volume of air is directed in an initial air flow direction, and an outlet end 28 at a front side 30 of the housing 22. The initial air flow direction is indicated by arrow 31 in FIGS. 2A and 2B. Preferably, the inlet end 24 and the outlet end 28 define a central plane 32 of the housing 22.

Figure 2A:
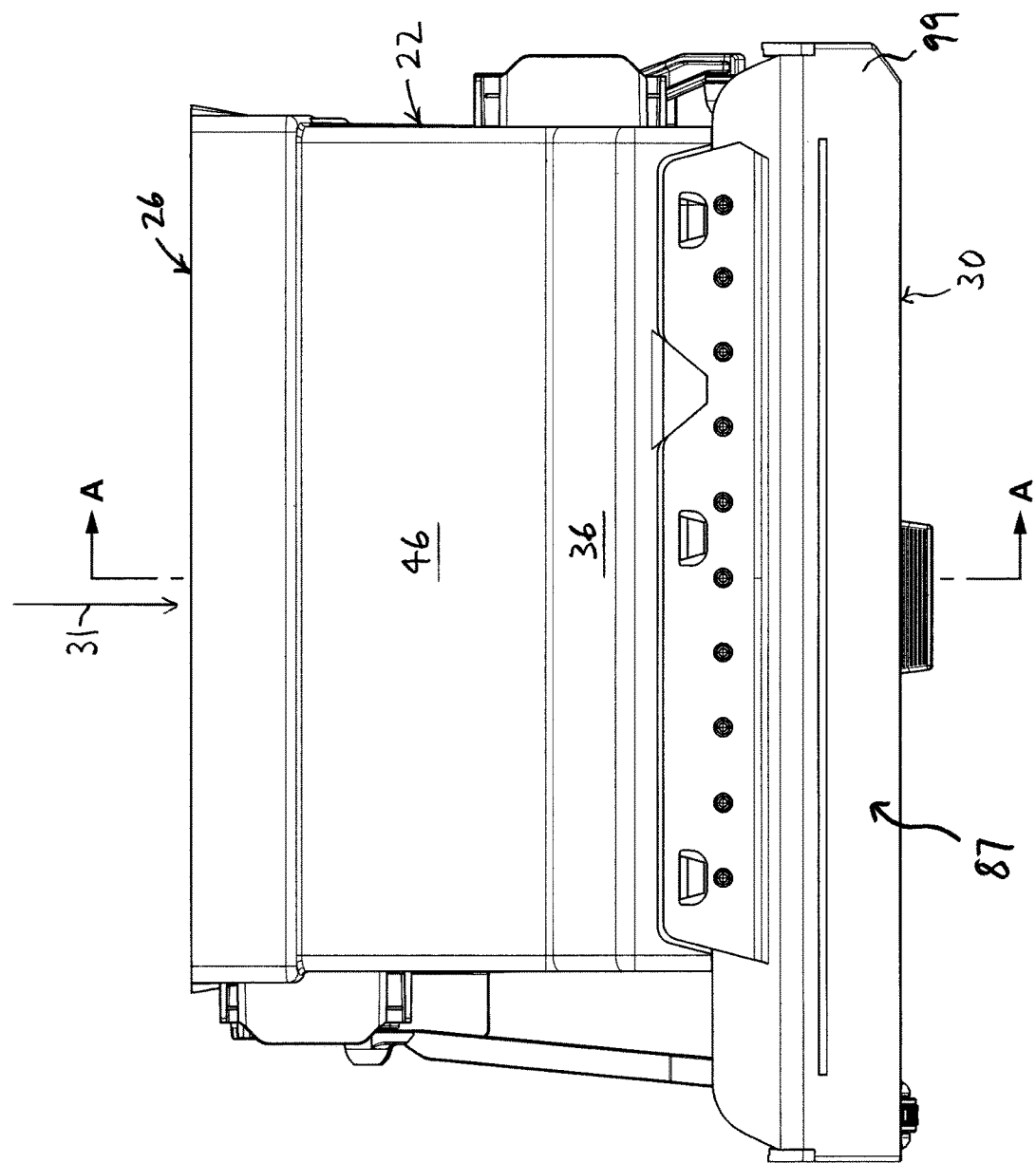
FIG. 2A is a top view of the ventilation system of FIGS. 1A and 1B.
Figure 2B:
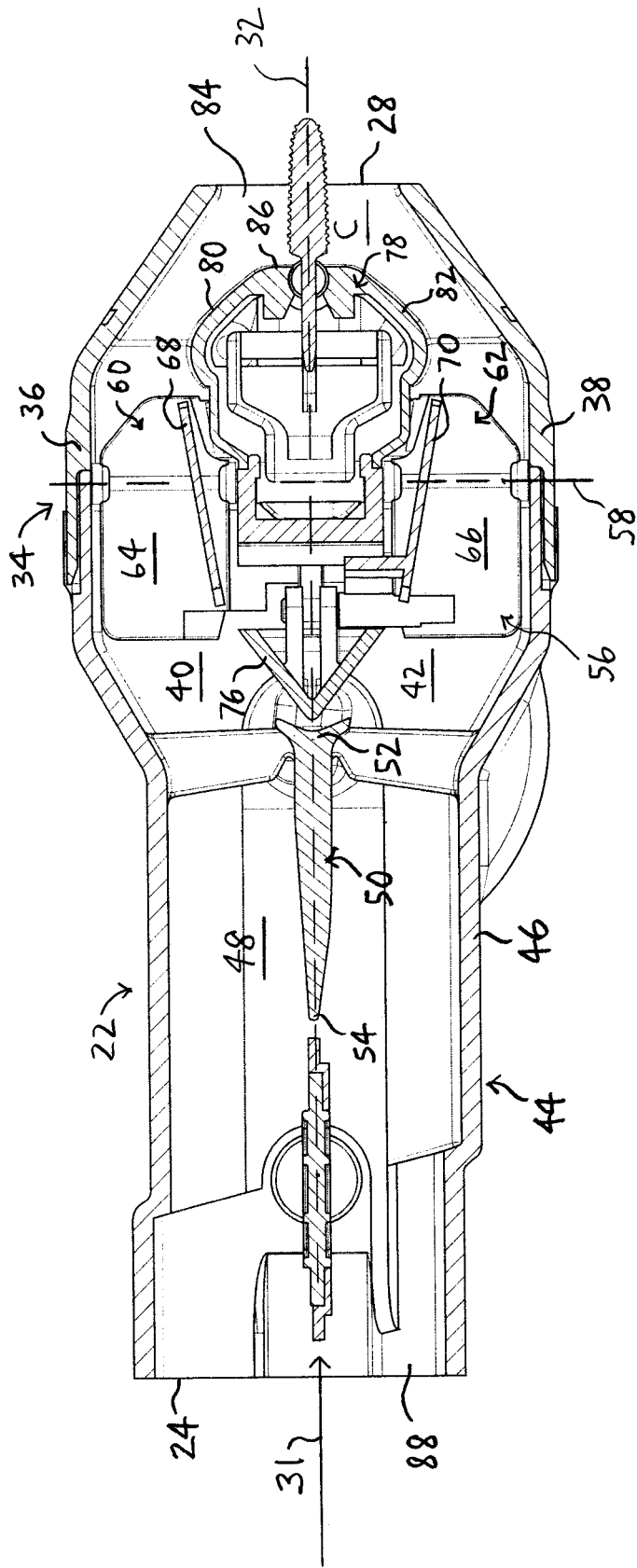
FIG. 2B is a longitudinal section of the ventilation system of FIG. 2A, taken along line A-A in FIG. 2A, with a damper in an open position and an air flow guide in a neutral position.

As can be seen in FIG. 2B, it is preferred that the housing 22 includes an outlet portion 34 thereof having first and second outer elements 36, 38 that are spaced apart from each other to partially define respective first and second channels 40, 42 for guiding the volume of air to the outlet end 28, as will be described.

Preferably, the housing 22 also includes an inlet portion 44 located between the inlet end 24 and the first and second channels 40, 42, the inlet portion 44 including one or more inlet portion walls 46 defining an inlet channel 48 that is in fluid communication with the first and second channels 40, 42 (FIG. 2B).

As can also be seen in FIG. 2B, the ventilation system 20 preferably also includes an air flow guide 50 extending between a base portion 52 and a tip 54 thereof. Preferably, the air flow guide 50 is movable between a first position (FIG. 3A), in which the tip 54 is located at a predetermined first minimum distance "$D_1$" from the inlet portion wall 46 and the air flow guide 50 directs a first major portion of the volume of the air flowing through the inlet channel 48 into the first channel 40, and a second position (FIG. 5A), in which the tip 54 of the air flow guide 50 is located at a predetermined second minimum distance "$D_2$" from the inlet portion wall and the air flow guide directs a second major portion of the volume of the air flowing through the inlet channel 48 into the second channel 42.

It will be understood that the air flow guide 50 is positionable in the first or second positions, or in any positions therebetween.

Figure 3A:
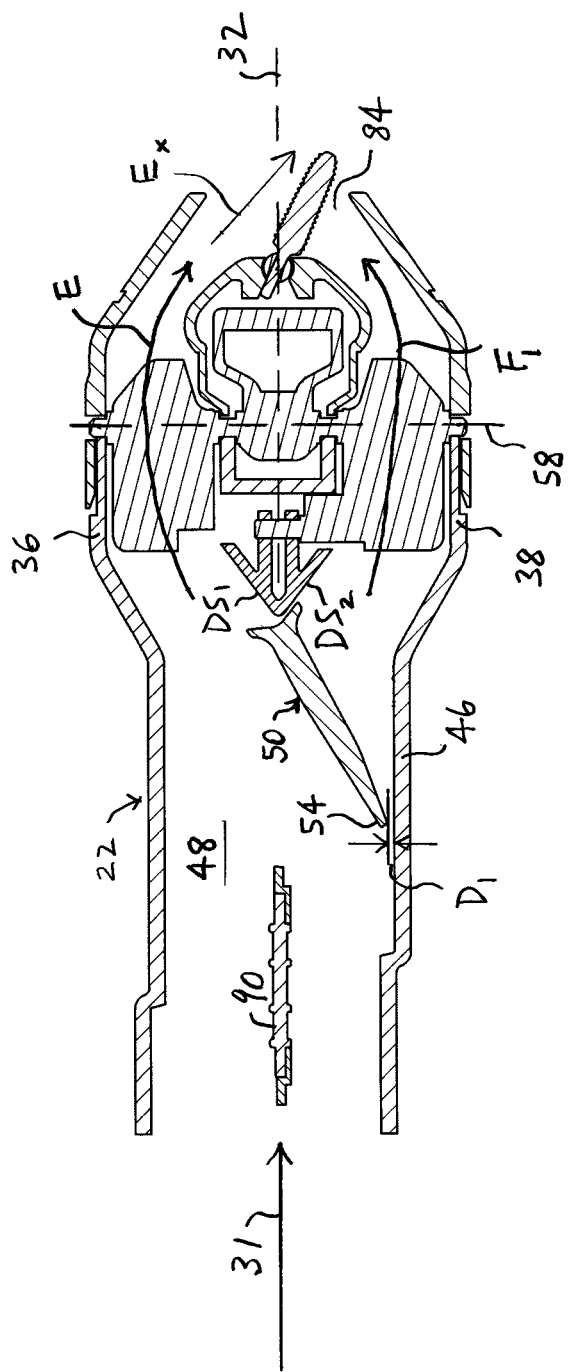
FIG. 3A is a longitudinal section of the ventilation system with the air flow guide thereof in the first position thereof.
Figure 5A:
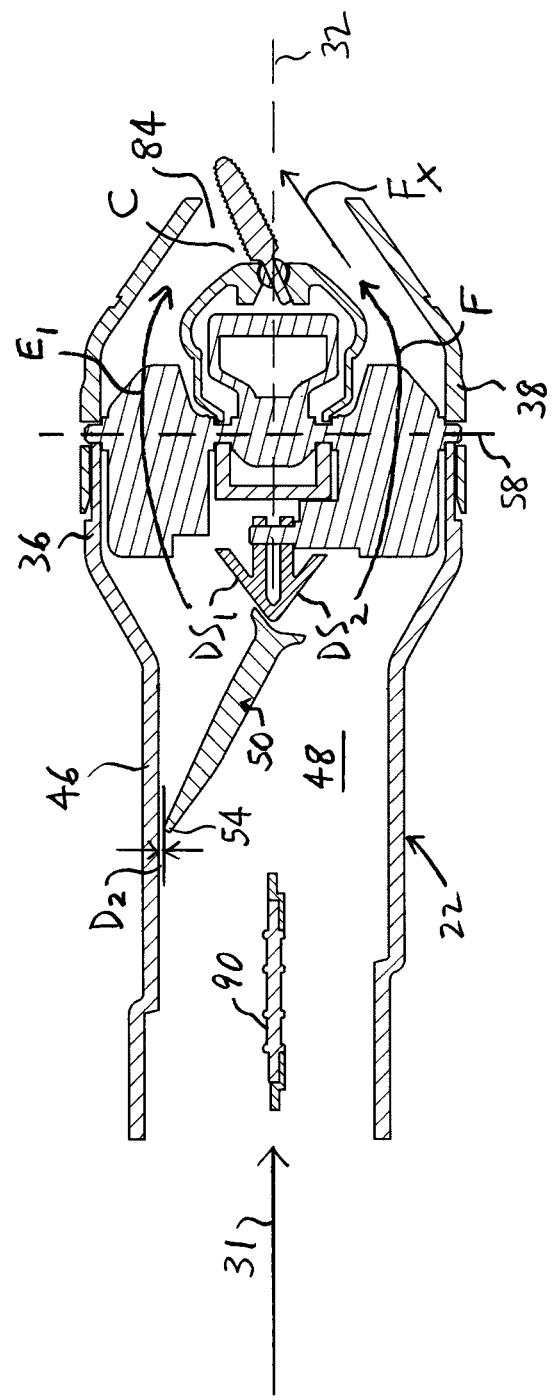
FIG. 5A is a longitudinal section of the ventilation system with the air flow guide thereof in a second position thereof, drawn at a smaller scale.

In FIG. 3A, the air flowing through the first channel 40 is schematically represented by arrow "E". In FIG. 5A, the air flowing through the second channel 42 is schematically represented by arrow "F".

It will be understood that, when the air flow guide 50 is in its first position (FIG. 3A), because the tip 54 is spaced apart from the inlet portion wall 46, some of the air flowing through the inlet channel 48 flows through the gap defined by the minimum distance "$D_1$", and subsequently flows through the second channel 42. In FIG. 3A, the air flowing through the second channel 42 is schematically represented by arrow "$F_1$".

It will also be understood that, when the air flow guide 50 is in its second position (FIG. 5A), because the tip 54 is spaced apart from the inlet portion wall 46, some of the air flowing through the inlet channel 48 flows through the gap defined by the minimum distance "$D_2$", and subsequently flows through the first channel 40. In FIG. 5A, the air flowing through the first channel 40 is schematically represented by arrow "$E_1$".

Figure 4A:
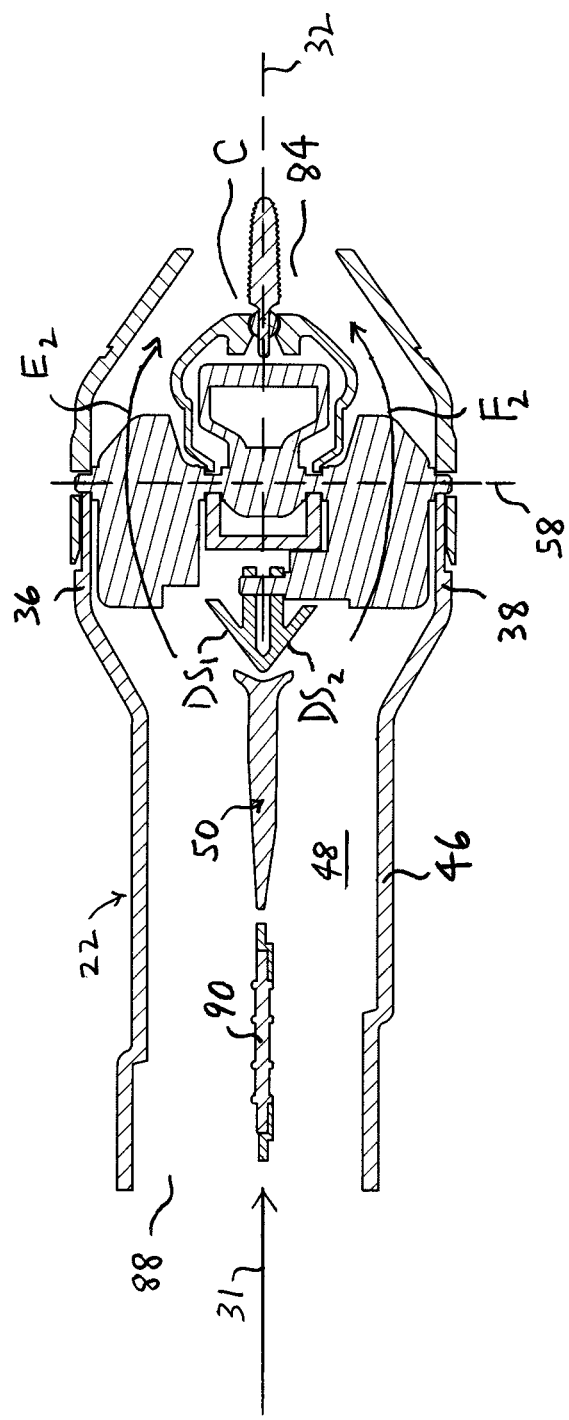
FIG. 4A is a longitudinal section of the ventilation system with the air flow guide thereof in a neutral position thereof, drawn at a smaller scale.

As can be seen in FIG. 4A, the air flow guide 50 may be positioned in a neutral position, in which the air flowing through the inlet channel 48 is split equally, or substantially equally, between the first and second channels 40, 42. In FIG. 4A, the air flowing through the first and second channels 40, 42 is schematically represented by arrows "$E_2$" and "$F_2$" respectively.

Those skilled in the art would appreciated that the arrows "E", "$E_1$", "$E_2$", "F", "$F_1$", and "$F_2$" all are intended only to generally, and approximately, indicate the direction of movement of the volume of air through the first and second channels 40, 42.

In one embodiment, the ventilation system 20 preferably also includes a number of cross-car vanes 56 mounted between the first and second outer elements 36, 38 and pivotable about respective vane axes 58 thereof located orthogonal to the initial air flow direction, for directing the volume of air flowing through the first and second channels 40, 42 in a selected direction relative to the initial air flow direction. The air may be directed by the cross-car vanes in a direction that is the same as, or parallel to, the initial air flow direction. Alternatively, the air may be directed by the cross-car vanes in a direction that diverges from the initial air flow direction. The vane axes 58 are also located orthogonal to the air flow guide axis 72, and to the damper axis 92. The manner in which the cross-car vanes 56 are controlled will be described. As can be seen in FIG. 2B, each of the cross-car vanes 56 includes a first portion 60 partially located in the first channel 40, and a second portion 62 partially located in the second channel 42.

The first and second portions 60, 62 include respective first portion and second portion bodies 64, 66 (FIG. 2B). Preferably, the first and second portions 60, 62 also include respective first and second projections 68, 70 that project from the first portion and second portion bodies 64, 66 respectively (FIGS. 2B, 7A-7C). As can be seen in FIG. 2B, the first projection 68 preferably is spaced apart from the first outer element 36 to at least partially define the first channel 40, and the second projection 70 preferably is also spaced apart from the second outer element 38 to at least partially define the second channel 42.

Figure 6A:
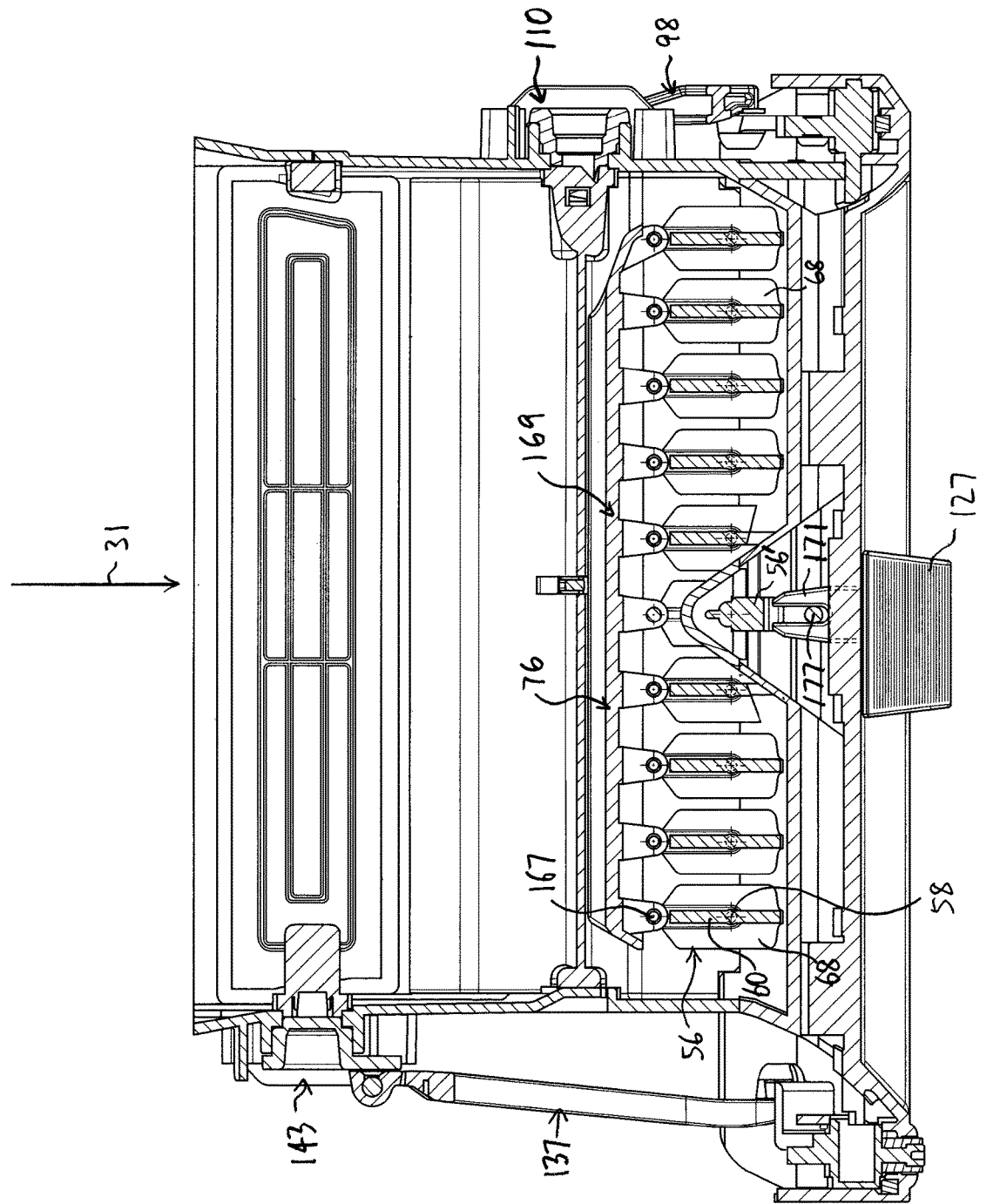
FIG. 6A is a cross-section of the ventilation system of FIGS. 1A and 2C taken along line B-B in FIG. 2C showing the cross-car vanes in central positions thereof generally aligned or parallel with an initial air flow direction, drawn at a smaller scale.
Figure 6B:
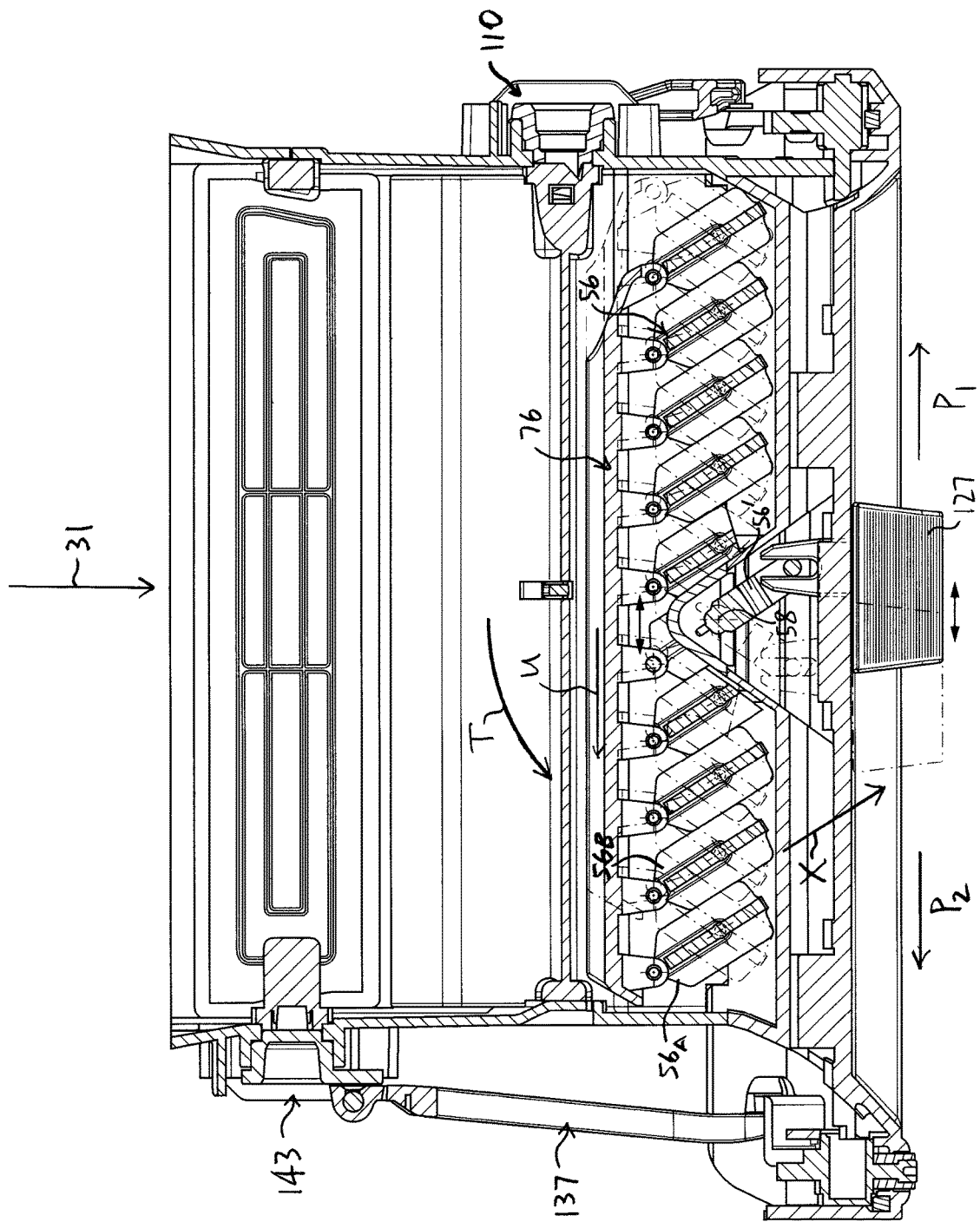
FIG. 6B is a cross-section of the ventilation system of FIG. 1A showing the cross-car vanes in positions thereof to direct air flowing through the housing in another selected direction diverging from the initial air flow direction.

It is also preferred that the first portion body 64 and the second portion body 66 are at least partially planar, and the first projection 68 and the second projection 70 are positioned at least partially orthogonal to the first portion body 64 and the second portion body 66 respectively. As can be seen in FIG. 2B, in one embodiment, the first and second projections 68, 70 preferably are also planar. As will be described, and as can be seen in FIGS. 6A and 6B, it is also preferred that the first projection and the second projection 68, 70 are located on both sides of the first and second portion bodies 64, 66.

As will be described, the air flow guide 50 preferably is pivotable about an air flow guide axis 72 (FIGS. 6C, 7C) through the base portion 52 of the air flow guide 50. Movement of the air flow guide 50 about the air flow guide axis 72 is controlled via an air flow guide control assembly 74 (FIG. 7A), as will also be described.

As can be seen in FIG. 2B, the ventilation system 20 preferably additionally includes an air flow director 76 located at least partially between the base portion 52 of the air flow guide 50 and the first and second projections 68, 70 of the first and second portions 60, 62, for partially directing the volume of air into the first and second channels 40, 42.

It can be seen in FIG. 2B that the air flow director 76 is separate from the air flow guide 50. The air flow director 76 accordingly directs air flowing past it into the first and second channels 40, 42, independent of the position of the air flow guide 50. Preferably, and as can be seen in FIG. 2B, the air flow director includes surfaces "DS$_1$", "DS$_2$" (FIGS. 3A, 4A, 5A) that are aligned with the first and second projections 68, 70, to minimize turbulence in the air flowing through the first and second channels 40, 42.

Including the first and second projections 68, 70 in the cross-car vanes 56 has the advantage of reducing the cost of manufacturing the ventilation system 20, compared to the devices of the prior art.

As can also be seen in FIG. 2B, the ventilation system 20 preferably also includes a central element 78, located proximal to the outlet end 28 of the housing 22. Preferably, the central element 78 includes respective first and second surfaces 80, 82 that are at least partially located in relation to the first and second outer elements 36, 38 respectively to partially define the first and second channels 40, 42 respectively.

At the outlet end 28 of the housing 22, the first and second outer elements 36, 38 preferably are spaced apart to define an outlet opening 84, through which the volume of air directed through the first and second channels 40, 42 exits the housing 22. As can be seen in FIG. 2B, the central element 78 preferably includes one or more end surfaces 86 that are positioned facing the outlet opening 84.

Figure 2C:
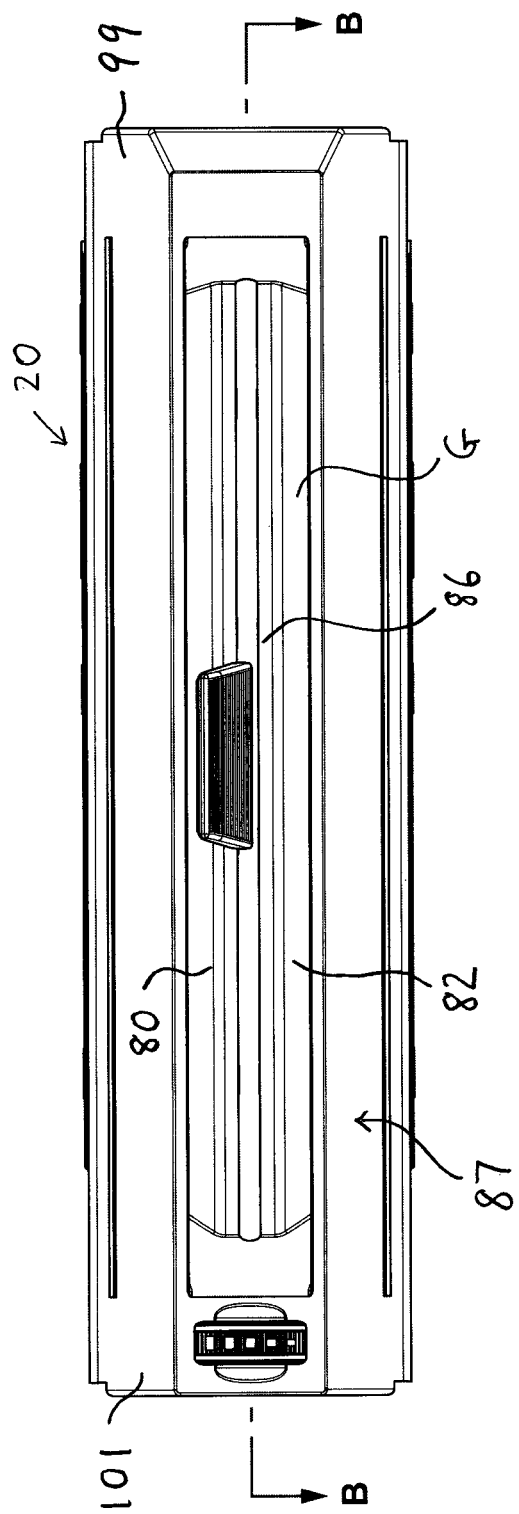
FIG. 2C is a front view of the ventilation system of FIG. 2A.
Figure 2D:
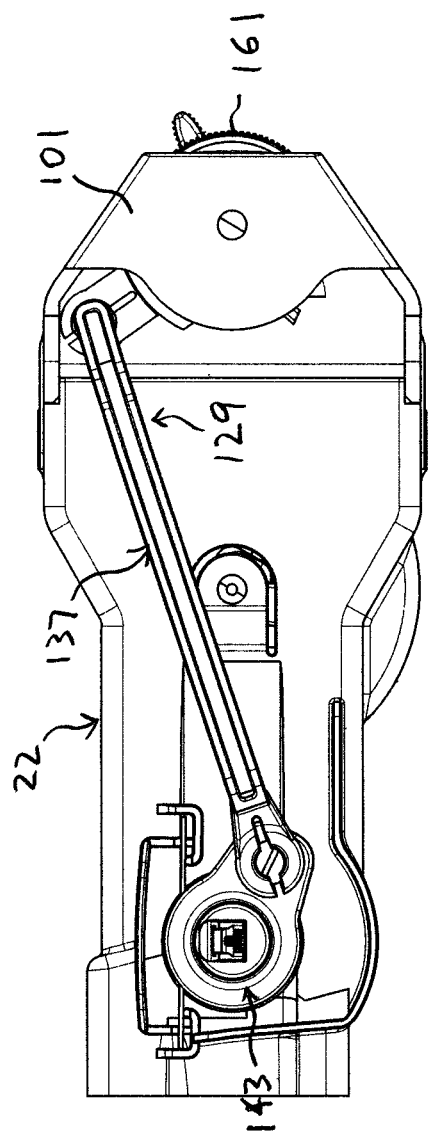
FIG. 2D is a first side view of the ventilation system of FIG. 2A, in which a damper control assembly is shown locating a damper in an open position thereof.

Preferably, the housing 22 also includes a front cover element 87 (FIG. 2C), as will be described. As can be seen in FIG. 2C, the front cover element 87 includes an opening "G" that is substantially aligned with the outlet opening 84. The end surface 86 and the first and second surfaces 80, 82 are viewable by a user (not shown) through the opening "G" of the front cover element 87 and the outlet opening 84 (FIG. 2C). The region between the end surface 86 and the outlet end 28 is identified by reference character "C" for convenience.

When the air flow guide 50 is in the first position (FIG. 3A), most of the air is directed through the first channel 40, and as can be seen in FIG. 3A, the air exiting the first channel 40 is directed generally in the direction indicated by arrow "E$_x$". Accordingly, it can be seen in FIG. 3A that when the air flow guide 50 is in the first position, most of the air exiting via the outlet opening 84 is directed transversely to the central plane 32. As illustrated in FIG. 3A, the air exiting the first channel 40 is directed in a generally downward direction.

As noted above, when the air flow guide 50 is in the first position, some air is allowed to flow between the tip 54 of the air flow guide 50 and the inlet portion wall 46, to flow through the second channel 42 toward the outlet opening 84. It will be understood that some of the air flowing through the second channel 42, schematically represented by arrow "F$_1$" in FIG. 3A, mixes with the air flowing out of the first channel 40 in the region "C" (FIG. 2B).

When the air flow guide 50 is in the second position (FIG. 5A), most of the air is directed through the second channel 402 and as can be seen in FIG. 5A, the air exiting the second channel 42 is directed generally in the direction indicated by arrow "F$_x$". Accordingly, it can be seen in FIG. 5A that when the air flow guide 50 is in the second position, most of the air exiting via the outlet opening 84 is directed transversely to the central plane 32. As illustrated in FIG. 5A, the air exiting the second channel 42 is directed in a generally upward direction.

As noted above, when the air flow guide 50 is in the second position, some air is allowed to flow between the tip 54 of the air flow guide 50 and the inlet portion wall 46, to flow through the first channel 40 toward the outlet opening 84. It will be understood that some of the air flowing through the first channel 40, schematically represented by arrow "E$_1$" in FIG. 5A, mixes with the air flowing out of the second channel 42 in the region "C" (FIG. 2B).

As can be seen in FIG. 4A, when the air flow guide 50 is in the neutral position, the volume of air flowing into the inlet opening 88 is divided by the air flow guide 50 and by the air flow direction 76 into substantially equal volumes of air flowing through the first and second channels 40, 42. It is believed that the air flowing out of the first and second channels 40, 42 at least partially mix in the region "C", and are mixed together to be directed generally parallel to the central plane 32.

Figure 8:
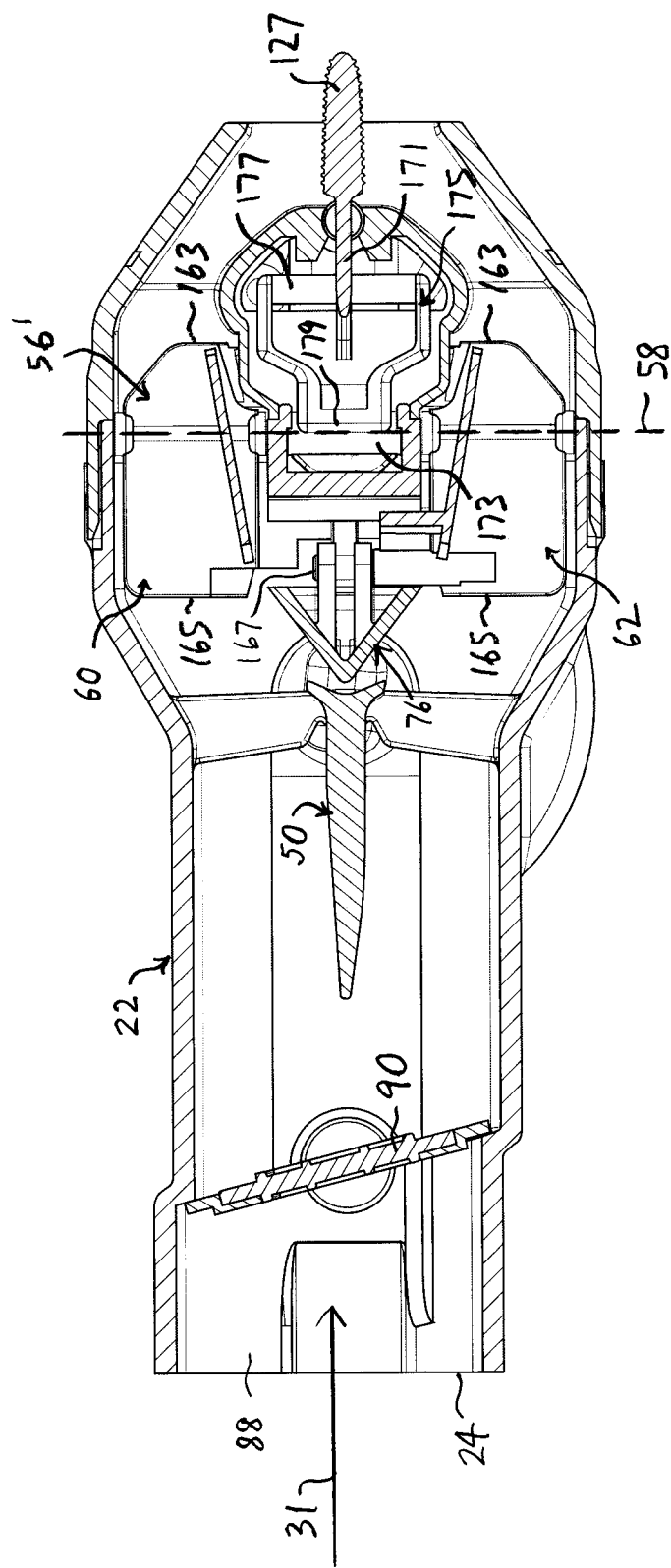
FIG. 8 is a longitudinal section of the ventilation system in which the damper thereof is in a closed position.

As can be seen in FIGS. 2B and 8, the inlet portion wall 46 defines an inlet opening 88 at the inlet end 24, into which the volume of air is directed. In one embodiment, the ventilation system 20 preferably also includes a damper 90 positioned between the inlet end 24 and the air flow guide 50. Preferably, the damper 90 is movable between an open position (FIG. 2B), in which the volume of air is flowable through the inlet portion 44, and a closed position (FIG. 8), in which the damper 90 is positioned to resist flow of the volume of air through the inlet portion 44. Preferably, when the damper 90 is in its closed position, the damper 90 prevents, or substantially prevents, air from flowing past the damper 90 into the inlet portion 44. However, those skilled in the art would appreciate that small amounts of air may flow past the damper 90 when it is in the closed position thereof.

It is preferred that the damper 90 is rotatable about a damper axis 92 thereof (FIGS. 6A, 7A, 7C) between the closed and open positions thereof, as will be described.

Figure 3B:
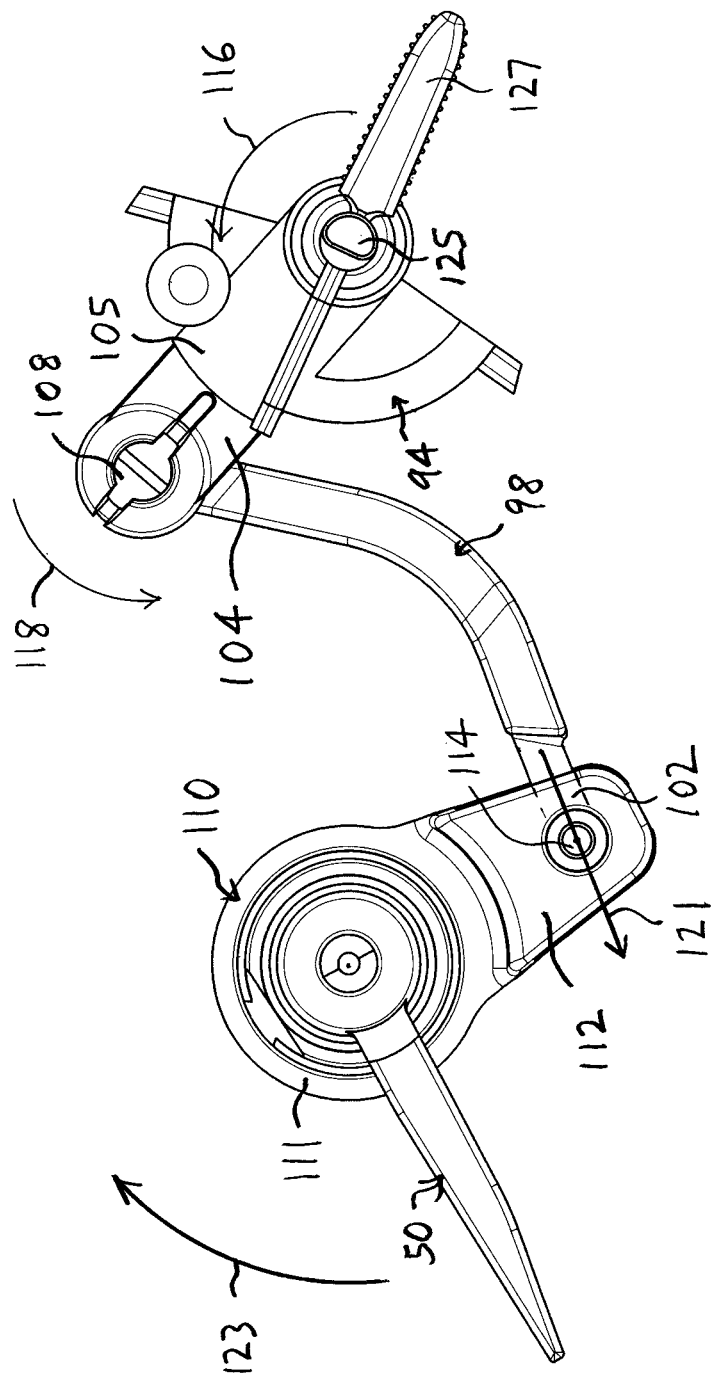
FIG. 3B is a side view of the air flow guide control assembly locating the air flow guide in the first position thereof, drawn at a larger scale.
Figure 7A:
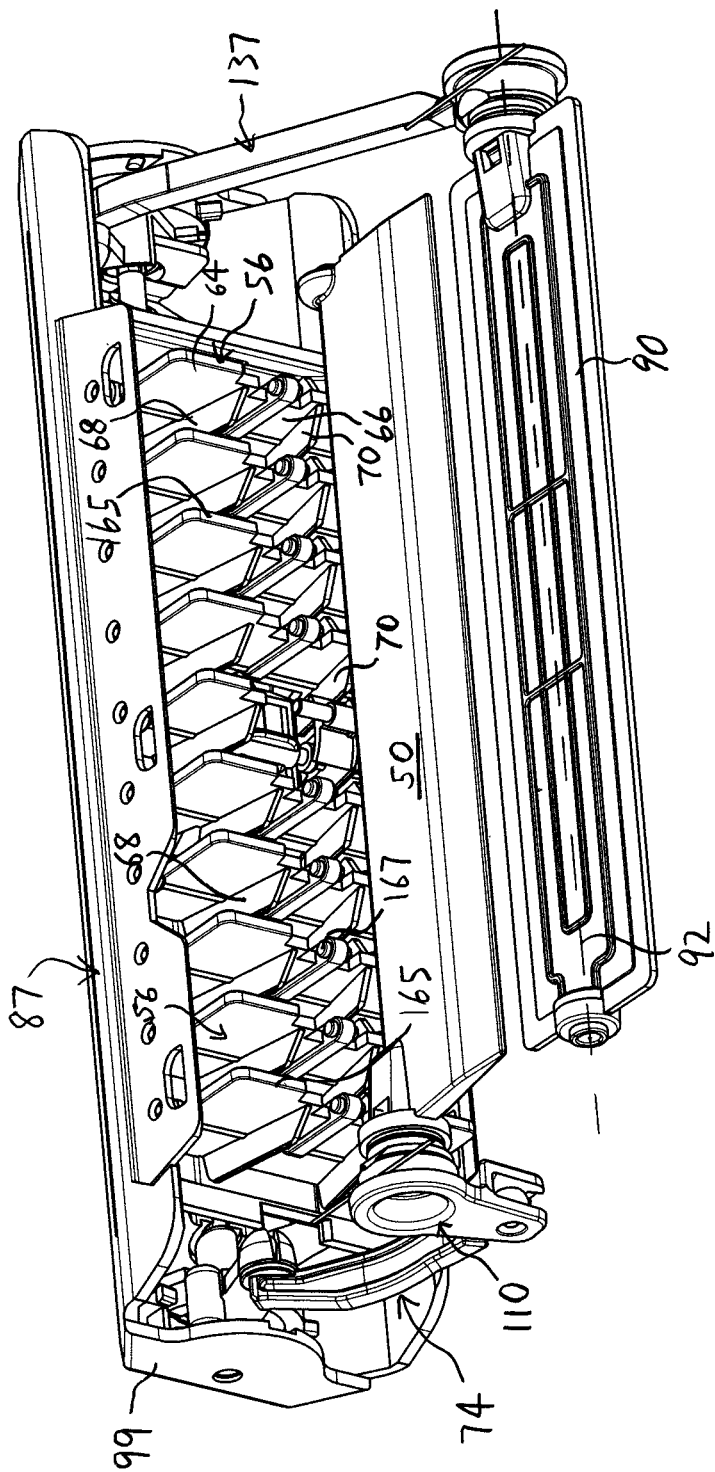
FIG. 7A is an isometric view of the cross-car vanes, the air flow guide, and the damper from the rear side of the ventilation system, with part of the housing omitted.
Figure 7B:
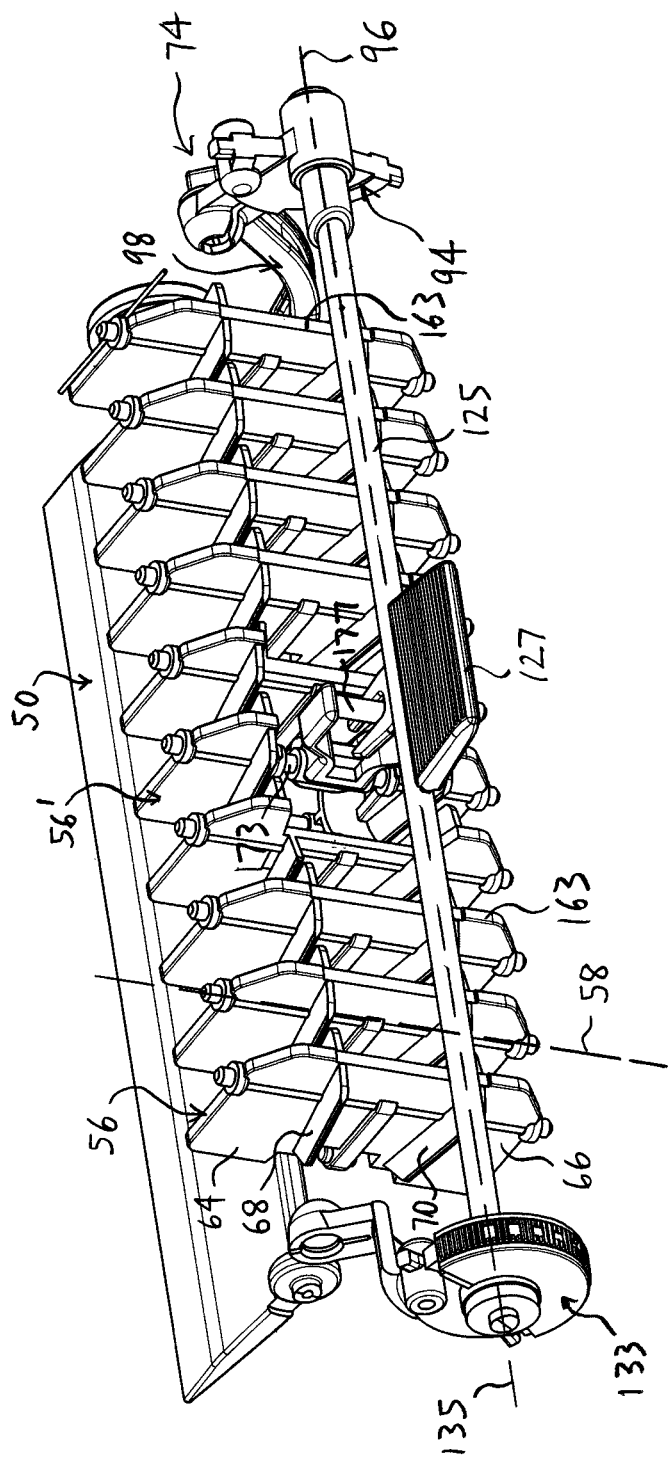
FIG. 7B is an isometric view of the cross-car vanes and portions of the damper control assembly and the air flow guide control assembly from the front side, with the housing omitted.
Figure 7C:
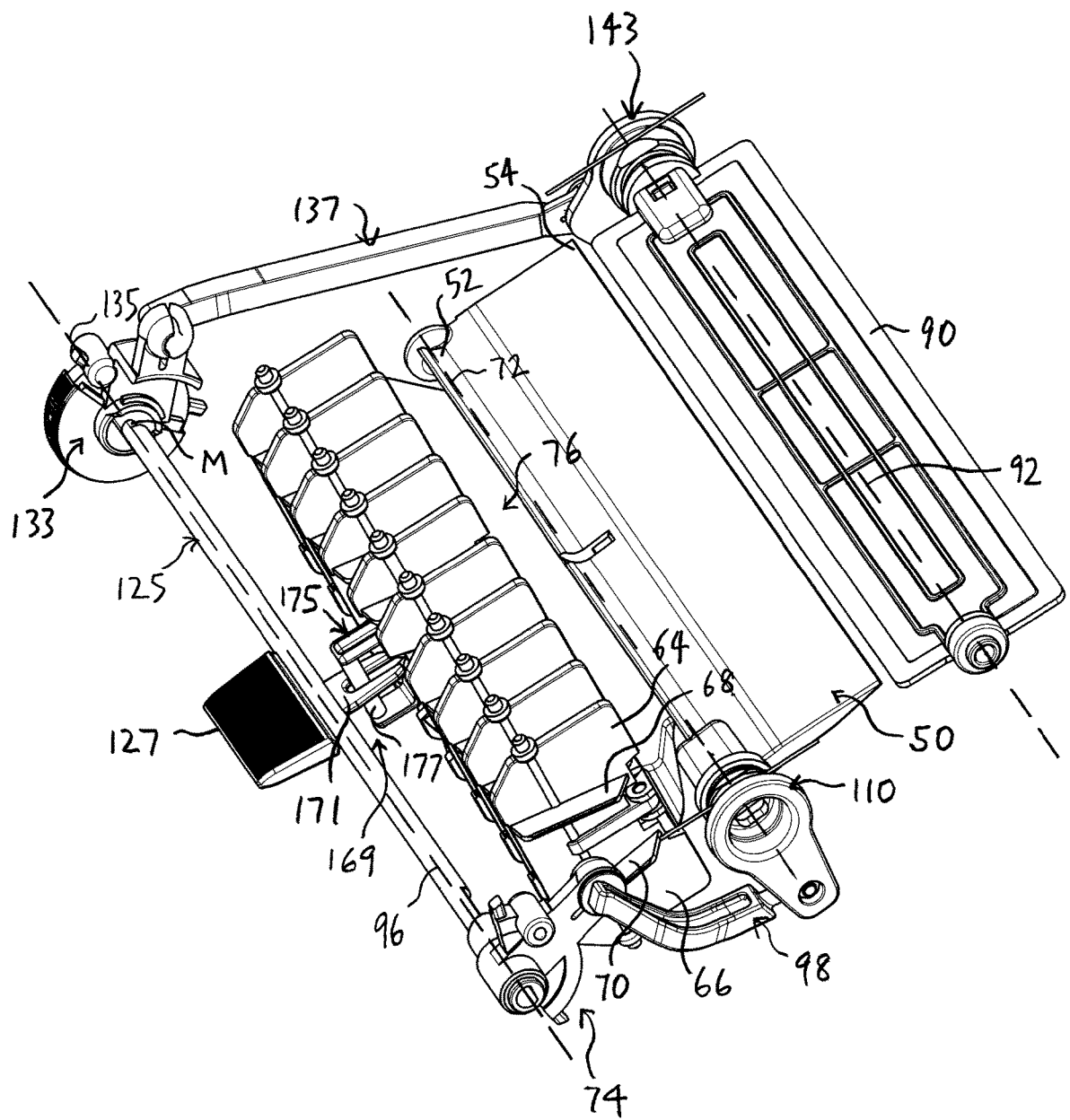
FIG. 7C is another isometric view of the cross-car vanes, the air flow guide, and the damper with the housing omitted.

In one embodiment, the ventilation system 20 preferably includes the air flow guide control assembly 74 (FIGS. 7A-7C). The air flow guide control assembly 74 is for locating the air flow guide 50 in a selected position relative to the central plane 32, as will be described. As can be seen in FIGS. 2I and 3B, the air flow guide control assembly 74 preferably includes a control element 94 rotatable about a control element axis 96 thereof (FIGS. 7B, 7C), and an air flow guide linkage arm 98, extending between inner and outer ends 100, 102 thereof (FIGS. 3B, 4B, 5B, 7A-7C).

Figure 1B:
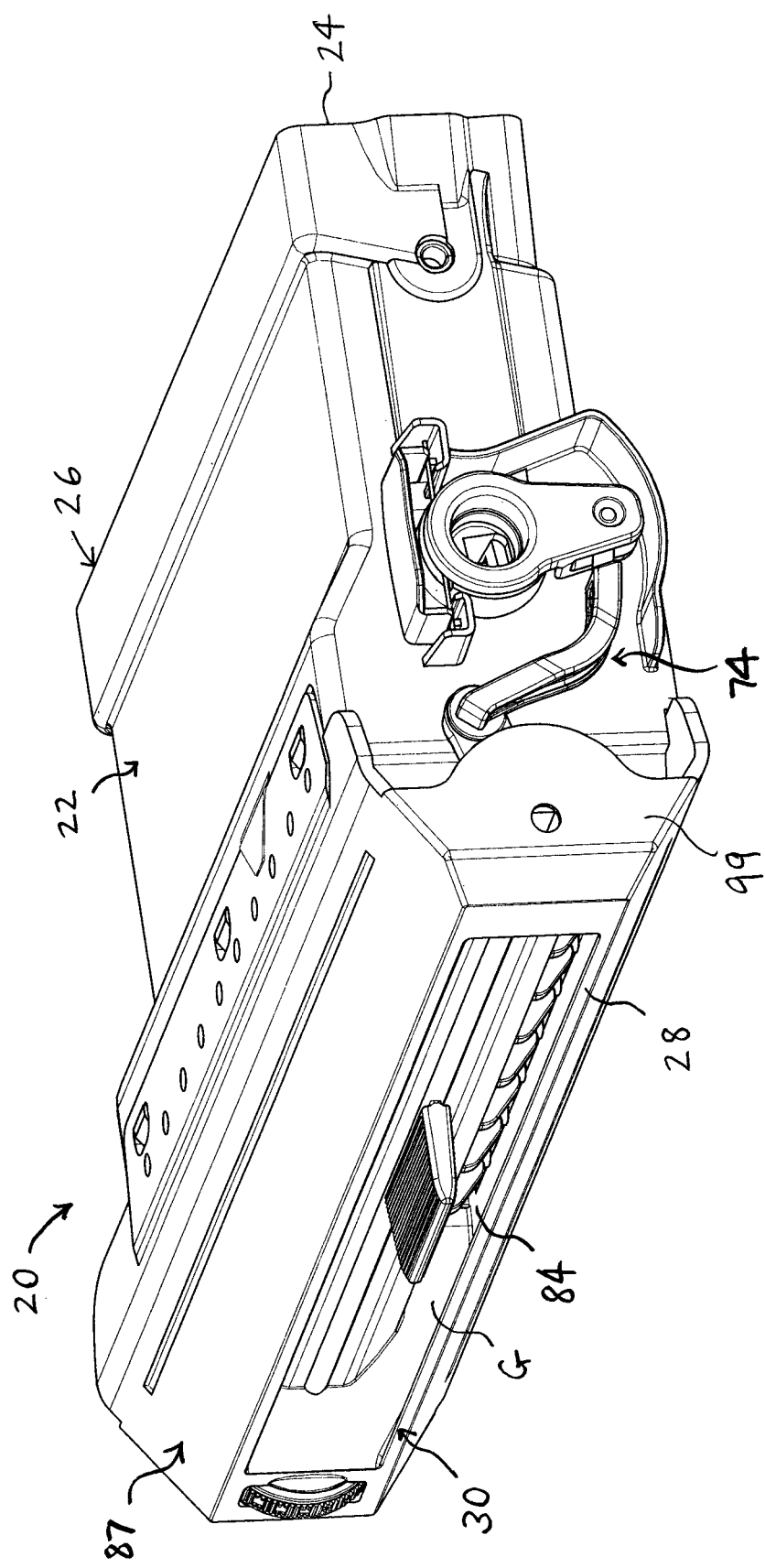
FIG. 1B is another isometric view of the ventilation system of FIG. 1A.
Figure 3D:
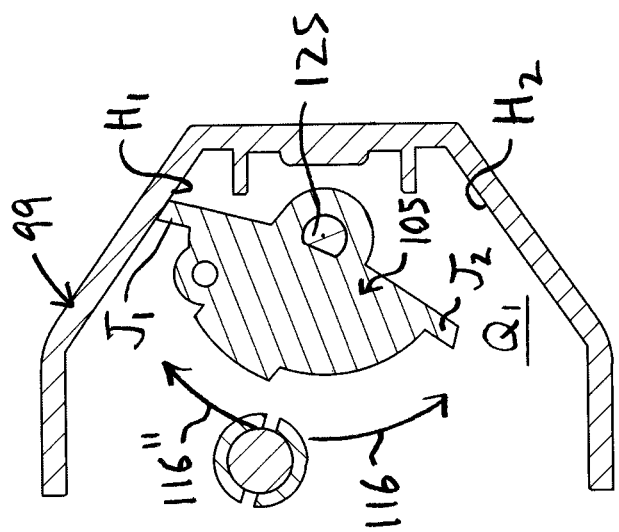
FIG. 3D is a cross-section of the control element of the air flow guide control assembly of FIG. 3B mounted inside the first end portion of the front cover element.

As will be described, the control element 94 preferably is partially located inside a first end portion 99 of the front cover element 87 (FIGS. 1A, 1B, 7A). The first end portion 99 defines a cavity "Q$_1$" in which the control element 94 is at least partially received (FIGS. 3D, 4C, 5C). It will be understood that the front cover element 87 is omitted from FIGS. 2I, 3A, and 3B for clarity of illustration.

Figure 3C:
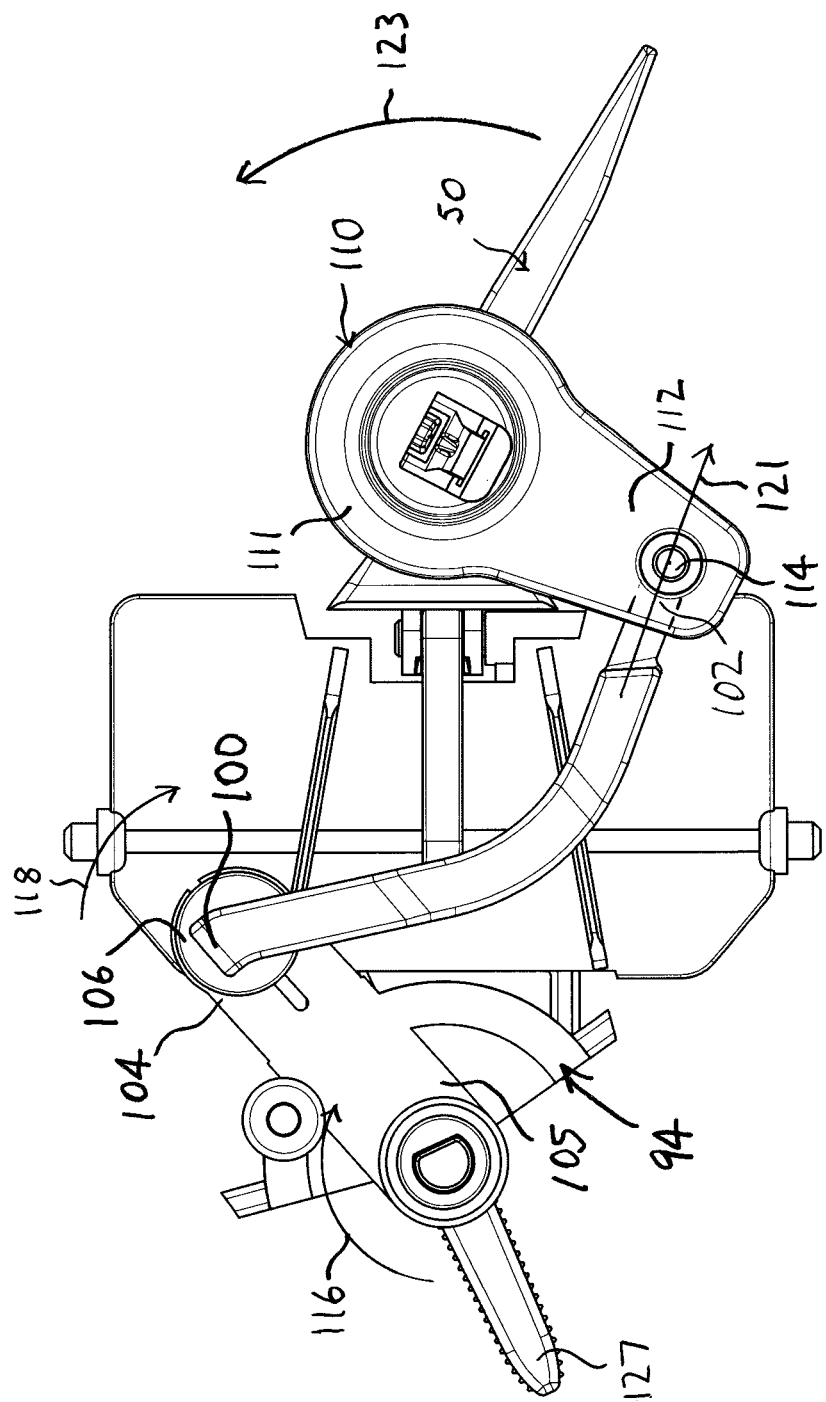
FIG. 3C is another side view of the air flow guide control assembly of FIG. 3B, drawn at a larger scale.

In one embodiment, the control element 94 preferably includes a control element body 105 and an elongate first extension portion 104 extending from the control element body 105 to an output end 106 thereof (FIGS. 3B, 3C). As can be seen in FIGS. 3D, 4C, and 5C, the body 105 of the control element 94 preferably is located in the cavity "Q$_1$". Preferably, the first extension portion 104 is pivotably connected by a pivot pin 108 (FIG. 3B) with the inner end 100 of the air flow guide linkage arm 98 at the output end 106 of the first extension portion 104.

As can be seen in FIGS. 3B and 3C, the air flow guide control assembly 74 preferably also includes an air flow guide connector 110 that includes a connector body 111 and an elongate second extension portion 112 extending from the connector body 111. It will be understood that the connector body 111 is secured to the air flow guide 50 at the base portion 52 thereof in any suitable manner, so that movement of the connector body 111 causes corresponding movement of the air flow guide 50.

Preferably, the air flow guide linkage arm 98 is pivotably connected by a pivot pin 114 at its outer end 102 to the second extension portion 112. As will be described, rotation of the control element 94 about the control element axis 96 causes corresponding rotation of the air flow guide 50 about the air flow guide axis 72.

For example, in FIGS. 3A and 3B, the air flow guide control assembly 74 as illustrated locates the air flow guide 50 in the first position thereof. As can be seen in FIGS. 3A, 3B, and 3C, rotation of the control element 94 about the control element axis 96 in the direction indicated by arrow 116 (FIGS. 3B, 3C, 3D) causes the first extension portion 104 to pivot generally downwardly (i.e., as indicated by arrow 118 in FIGS. 3B, 3C), which urges the air flow guide linkage arm 98 in the direction indicated by arrow 121 (FIGS. 3B, 3C). The movement of the air flow guide linkage arm 98 in the direction indicated by arrow 121 in turn causes the second extension portion 112 to pivot about the air flow guide axis 72 in the direction indicated by arrow 123. Because the air flow guide connector 110 is secured to the air flow guide 50, when the air flow guide connector 110 rotates about its axis as indicated by arrow 123, such movement causes corresponding movement of the air flow guide 50, in the direction indicated by arrow 123.

The pivoting movement of the control element body 105 in the direction indicated by arrow 116 may be stopped at that point, to locate the air flow guide 50 in the neutral position (FIG. 4A).

As can be seen in FIG. 7B, the air flow guide control assembly 74 preferably includes a rod 125 on which the control element 94 is mounted. The rod 125 defines the control element axis 96. It is also preferred that the air flow guide assembly 74 includes a tab 127 mounted to the rod 125. As can be seen, e.g., in FIGS. 3B and 3C, movement of the tab 127 about the control element axis 96 causes corresponding rotation of the rod 125 about the control element axis 96. In this way, the user can easily initiate movement of the air flow guide 50 to locate it in any selected position, by moving the tab 127 accordingly.

Figure 4B:
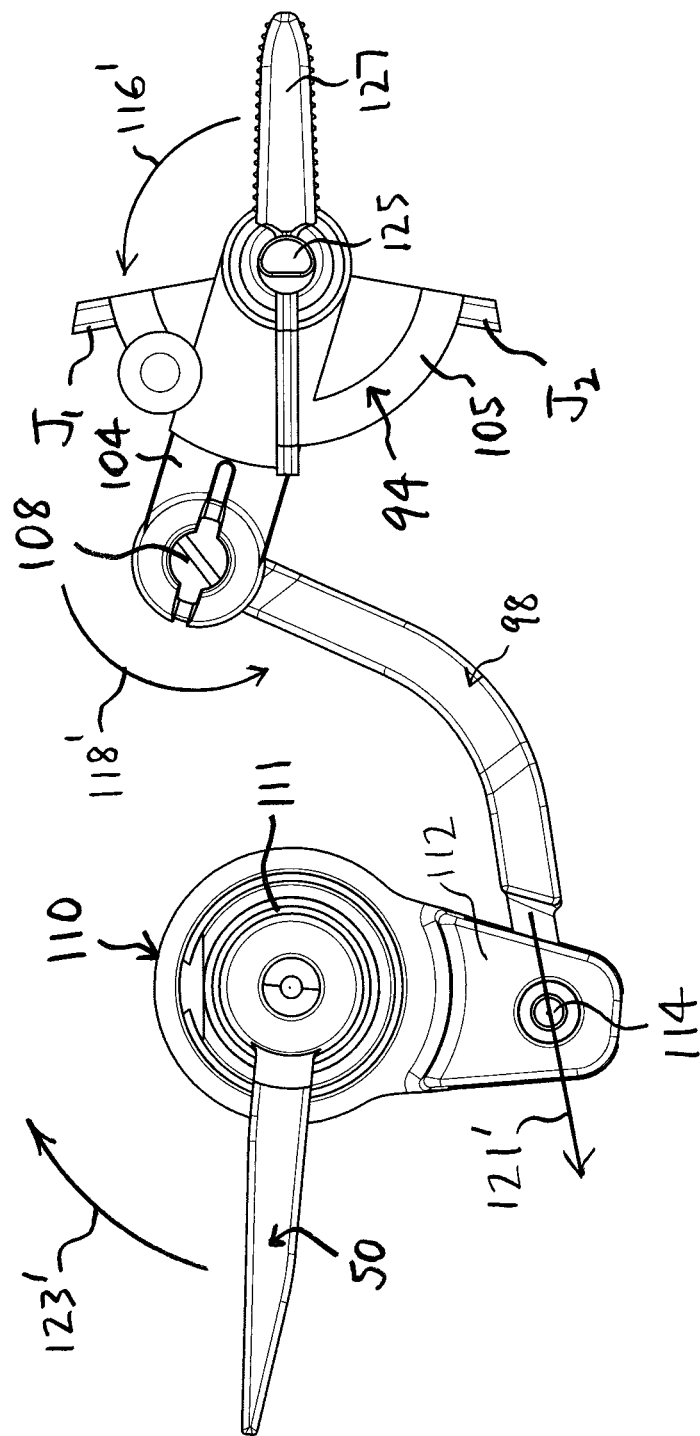
FIG. 4B is a side view of the air flow guide control assembly locating the air flow guide in the neutral position thereof, drawn at a larger scale.
Figure 4C:
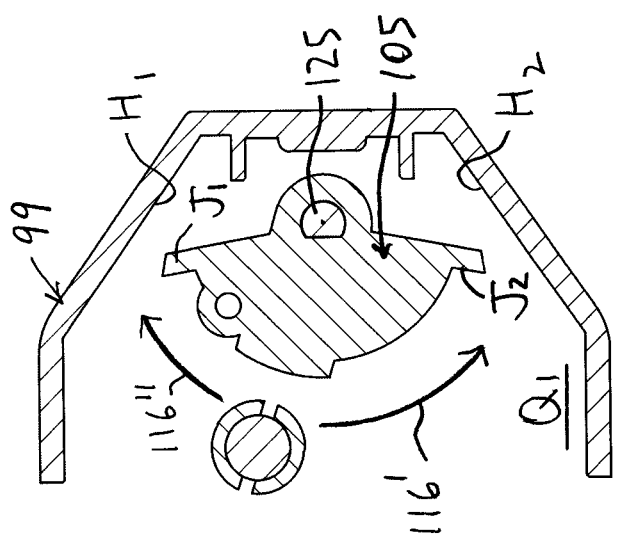
FIG. 4C is a cross-section of the control element of the air flow guide control assembly of FIG. 4B mounted inside the first end portion of the front cover element.

From the foregoing, it can be seen that pivoting movement of the control element 94 in the direction indicated by arrow 116 in FIGS. 3B, 3C, and 3D may be continued, for example, until the air flow guide 50 is in the neutral position, as illustrated in FIGS. 4A and 4B. It can also be seen in FIG. 4B that further pivoting movement of the control element 94 about the control element axis 96 in the direction indicated by arrow 116' causes generally downward pivoting movement of the output end 106 of the first extension portion 104 in the direction indicated by arrow 118'. In turn, this causes corresponding movement of the outer end 102 of the air flow guide linkage arm 100 in the direction indicated by arrow 121', which causes the air flow guide connector 110 to pivot about the air flow guide axis 72 in the direction indicated by arrow 123'.

Figure 5B:
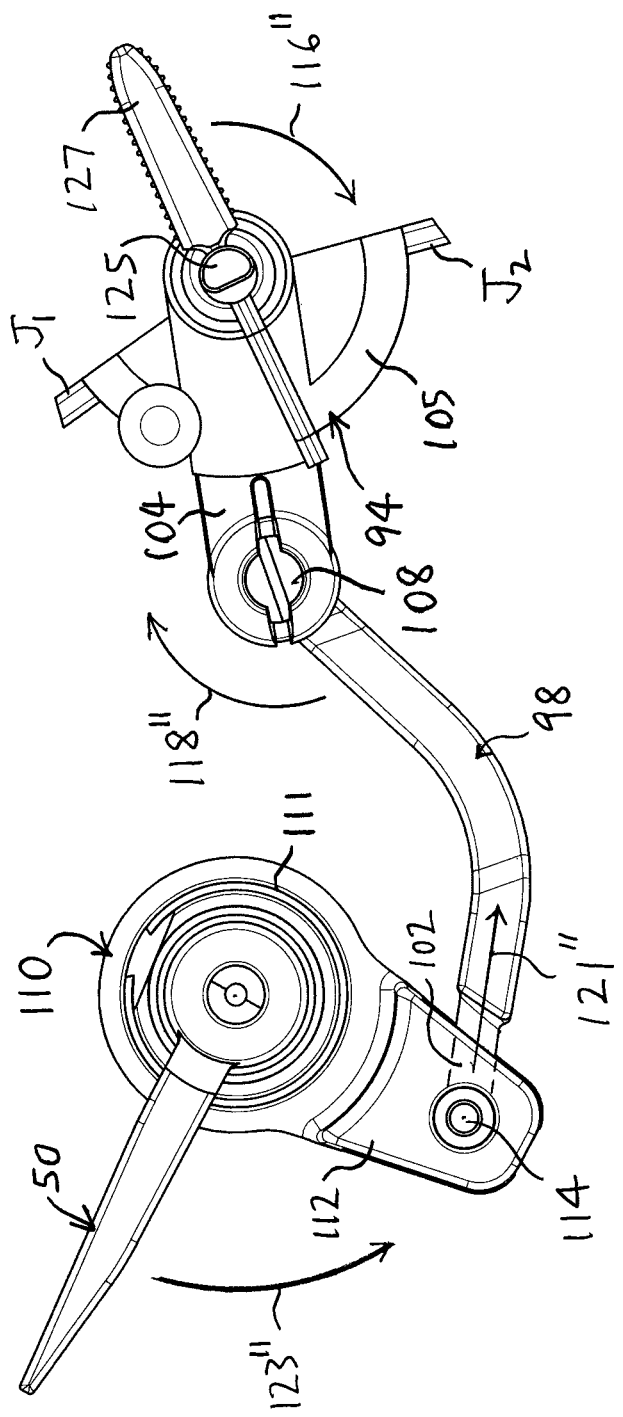
FIG. 5B is a side view of the air flow guide control assembly locating the air flow guide in the second position thereof, drawn at a larger scale.
Figure 5C:
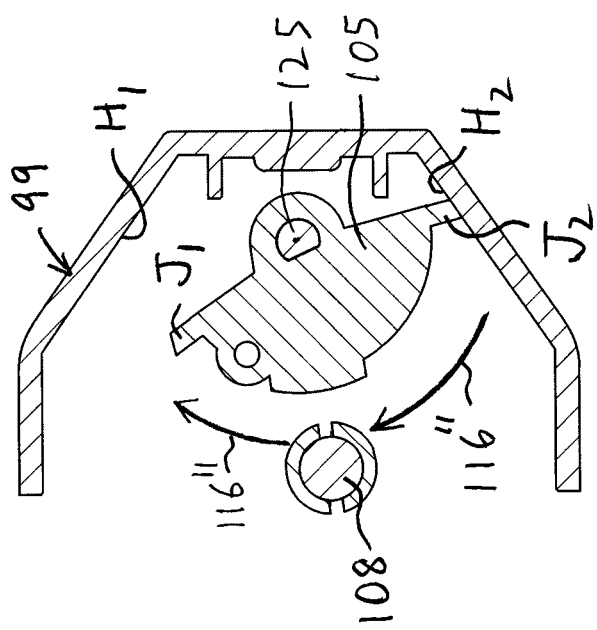
FIG. 5C is a cross-section of the control element of the air flow guide control assembly of FIG. 5B mounted in the first end portion of the front cover element.

It can also be seen, in FIGS. 4B and 5B, that the pivoting movement of the control element 94 in the direction indicated by arrow 116' in FIG. 4B may be continued until the air flow guide 50 is in the second position, as illustrated in FIGS. 5A and 5B.

As can be seen in FIG. 5B, when the air flow guide 50 is in the second position, it can then be moved therefrom toward the first position. Pivoting movement of the control element 94 about the control element axis 96 in the direction indicated by arrow 116" causes generally upward pivoting movement of the output end 106 of the first extension portion 104 in the direction indicated by arrow 118", as illustrated in FIG. 5B. In turn, this causes corresponding movement of the outer end 102 of the air flow guide linkage arm 100 in the direction indicated by arrow 121", which causes the air flow guide connector 110 to pivot about the air flow guide axis 72 in the direction indicated by arrow 123".

As noted above, the user may initiate the pivoting movement of the control element 94 in the direction indicated by arrow 116" by moving the tab 127 generally downwardly, to cause the rod 125 to pivot accordingly.

It will be understood that the pivoting movement of the control element 94 in the direction indicated by arrow 116" may be continued until the air flow guide 50 is in a selected position, i.e., a position that is selected by the user. Such pivoting movement may be continued, for example, until the air flow guide 50 is in the first position (FIG. 3A).

It will also be understood that the tab 127 may be positioned in any position that locates the air flow guide 50 in the first position or the second position, or any position selected therebetween. The movement of the control element body 105 about the control element axis 96 may be in any direction, as long as the position of the control element body 105 moves between the positions in which the stops "$J_1$", "$J_2$" engage the internal surfaces "$H_1$", "$H_2$". For example, the control element body 105 as illustrated in FIG. 4C is shown in its position when the air flow guide 50 is in its neutral position. As indicated in FIG. 4C, the control element body 105 may be moved in the direction indicated by arrow 116', to cause the air flow guide 50 to pivot toward the second position thereof, or alternatively the control element 105 may be moved in the direction indicated by arrow 116", to cause the air flow guide 50 to pivot toward the first position thereof.

As can be seen in FIGS. 1A and 1B, the front cover element 87 preferably extends between the first end portion 99 and a second end portion 101. The opening "G" preferably is located between the first and second end portions 99, 101. Also, and as can be seen in FIGS. 3D, 4C, and 5C, the first end portion 99 preferably defines the first cavity "$Q_1$" inside the first end portion 99, and the control element 94 is at least partially located therein. It will be understood that the control element body 105 is located in the first cavity "$Q_1$".

In FIG. 4C, the control element body 105 is shown positioned in the first portion 99 of the front cover element 87 when the air flow guide control assembly 74 has located the air flow guide 50 in the neutral position thereof (FIGS. 4A, 4B). As can be seen in FIG. 4C, the first portion 99 preferably includes first and second internal surfaces "$H_1$", "$H_2$" that at least partially define the first cavity "Q". Also, the control element body 105 preferably includes stops "$J_1$", "$J_2$". As shown in FIG. 4C, when the air flow guide control assembly 74 locates the air flow guide 50 in the neutral position thereof, the stops "$J_1$", "$J_2$" are not engaged with the internal surfaces "$H_1$", "$H_2$".

Referring to FIG. 4C, it can be seen that, when the control element body 105 is pivoted about the control element axis 96 in the direction indicated by the arrow 116, the control element body 105 continues to pivot in that direction until the stop "$J_2$" engages the internal surface "$H_2$". Similarly, when the control element body 105 is pivoted about the control element axis 96 in the direction indicated by the arrow 116″, the control element body 105 continues to pivot in that direction until the stop "$J_1$" engages the internal surface "$H_1$".

As noted above, when the air flow guide 50 is in its first position, the tip 54 is located spaced apart from the inlet portion wall 46 by the predetermined first minimum distance "$D_1$". It will be understood that the first stop "$J_1$" is formed so that the rotation of the control element body 105 in the direction indicated by arrow 116″ is stopped at the point where the air flow guide 50 locates the tip 54 spaced apart from the inlet portion wall 46 by the predetermined first minimum distance "$D_1$".

In FIG. 3D, the control element body 105 is shown located in the position it is in when the air flow guide control assembly 74 locates the air flow guide 50 in the first position thereof. As can be seen in FIG. 3D, when the first stop "$J_1$" engages the first internal surface "$H_1$", further movement of the control element body 105 in the direction indicated by the arrow 116″ is prevented by the internal surface "$H_1$" of the first end portion 99.

As noted above, when the air flow guide 50 is in its second position, the tip 54 is located spaced apart from the inlet portion wall 46 by the predetermined second minimum distance "$D_2$". It will be understood that the first stop "$J_2$" is formed so that the rotation of the control element body 105 in the direction indicated by arrow 116 is stopped at the point where the air flow guide 50 locates the tip 54 spaced apart from the inlet portion wall 46 by the predetermined first minimum distance "$D_2$".

In summary, the first stop "$J_1$" engages the first internal surface "$H_1$" to locate the air flow guide 50 in the first position thereof, in which the tip 54 is spaced apart from the inlet portion wall 46 by the predetermined first minimum distance "$D_1$". The second stop "$J_2$" engages the second internal surface "$H_2$" to locate the air flow guide 50 in the second position thereof, in which the tip 54 is spaced apart from the inlet portion wall 46 by the predetermined second minimum distance "$D_2$".

From the foregoing, it can be seen that the air flow guide control assembly 74 positions the air flow guide 50 in the first position and in the second position because of the respective stops "$J_1$", "$J_2$". As noted above, the control element 94 is rotated by the user rotating the tab 127 about the control element axis 96. It will be understood that, when the user rotates the rod 125 in the direction indicated by arrow 116″, upon the first stop "$J_1$" engaging the first internal surface "$H_1$", the user is thereby made aware that the air flow guide control assembly 74 has located the air flow guide 50 in the first position thereof. Similarly, when the tab 127 is rotated in the opposite direction (i.e., in the direction indicated by arrow 116), upon the second stop "$J_2$" engaging the second internal surface "$H_2$", the user is thereby made aware that the air flow guide assembly 74 has located the air flow guide 50 in the second position thereof.

Those skilled in the art would appreciate that the air flow guide control assembly 74 may also include a position notification device (not shown) which signals to the user when the control element body 105 is in a preselected position. In one embodiment, the position notification device may simply notify the user by emitting an audible "click" when the control element body 105 is in the positions thereof that correspond respectively to the first position, the neutral position, and the second position of the air flow guide 72. The position notification device may utilize any suitable means.

For example, in one embodiment, the position notification device may include a spring-loaded pin mounted in a pin housing secured to the control element body. The pin is mounted so as to press against a side part (not shown) of the first end portion, and when the control element 94 is rotated about the control element axis 96. Preferably, the side part includes dimples or depressions located in the side part to correspond to the first and second and neutral positions. The pin rapidly moves into the dimple, to strike the side part in the dimple, when the control element body 105 has been rotated to locate the pin at the dimple. When the pin rapidly moves into the dimple, urged by the spring pushing it, the impact of the pin produces an audible "click", confirming that the control element 94 is in the correct position to locate the air flow guide 50 in the first position, or the neutral position, or the second position, as the case may be.

It will be understood that, because the tip 54 is located a predetermined distance apart from the inlet portion wall 46 when the air flow guide 50 is in its first or second position, the air pressure pushing against the air flow guide 50 when it is in either of those two positions is limited. If instead the tip 54 were engaged with the inlet portion wall 46 when the air flow guide 50 is in either extreme position, then the air flowing into the inlet would push against the air flow guide 50, so that the user would be unable in that case to move the air flow guide without overcoming the air pressure against the air flow guide 50.

For example, when the air flow guide 50 is in its first position, the user can easily cause the air flow guide 50 to pivot toward its second position because the air that is allowed to flow through the gap defined by the predetermined first minimum distance "$D_1$" partially reduces the air pressure directed in the initial air flow direction that is pushing against the air flow guide 50. In the same way, when the air flow guide 50 is in its second position, the user can easily cause the air flow guide 50 to move from the second position toward the first position.

As noted above, it is preferred that the ventilation system 20 includes the damper 90, rotatable about the damper axis 92 between closed and open positions thereof. The ventilation system 20 preferably also includes a damper control assembly 129, for controlling movement of the damper 90. In one embodiment, the damper control assembly 129 preferably includes a damper control element 133, rotatable about a damper control axis 135 thereof, and a damper linkage arm 137 extending between inner and outer ends 139, 141 thereof.

Figure 2E:
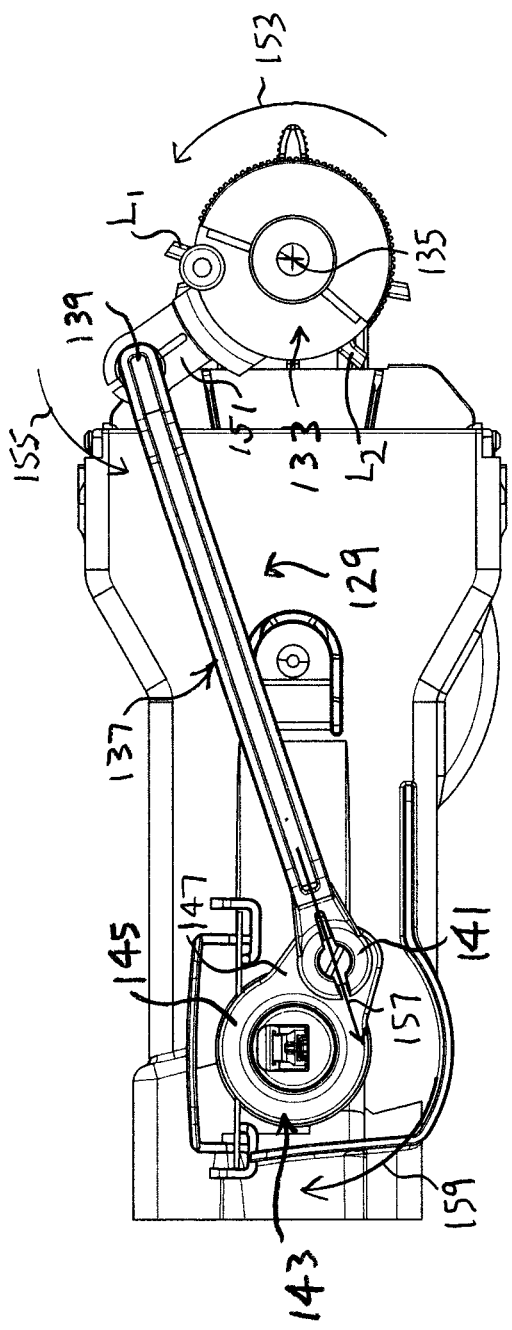
FIG. 2E is the first side view of FIG. 2D with a front cover element of the ventilation system omitted, to show a thumbwheel of the damper control assembly.
Figure 2F:
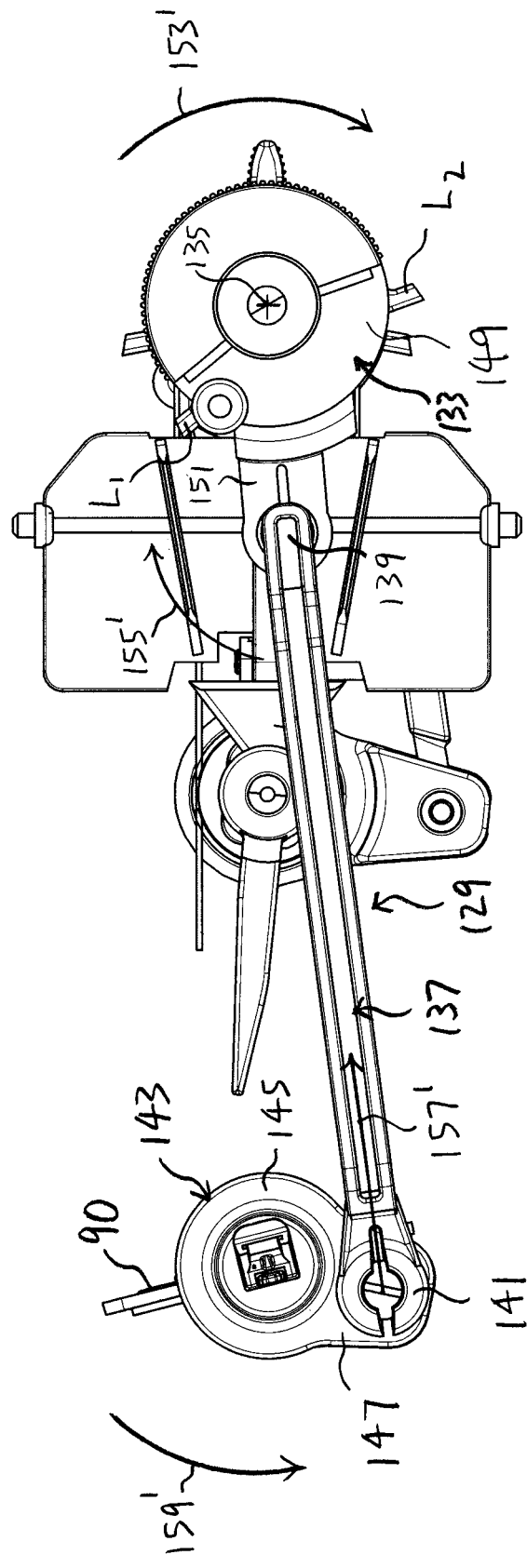
FIG. 2F is the first side view of FIG. 2E in which the damper control assembly is shown locating the damper in a closed position thereof.

As can be seen in FIGS. 2E and 2F, the damper control assembly 129 preferably also includes a damper connector 143 that is secured to the damper 90. Preferably, the damper connector 143 includes a connector body 145 and an elongate portion 147 extending from the connector body 145.

It can also be seen in FIGS. 2E and 2F that the outer end 141 of the damper linkage arm 137 preferably is pivotably connected with the damper control element 133. Also, the inner end 139 of the damper linkage arm 137 preferably is pivotably connected with the elongate portion 147 of the damper connector 143. Rotation of the damper control element 133 about the damper control axis 135 causes corresponding rotation of the damper 90 about the damper axis 92.

Preferably, the second end portion 101 of the front cover element 87 defines a second cavity "R" therein. The damper control element 133 is at least partially located in the cavity "R".

In one embodiment, the damper control element 133 preferably includes a damper control element body 149 and an elongate damper control element extension 151 that extends from the damper control element body 149 (FIG.

Figure 2G:
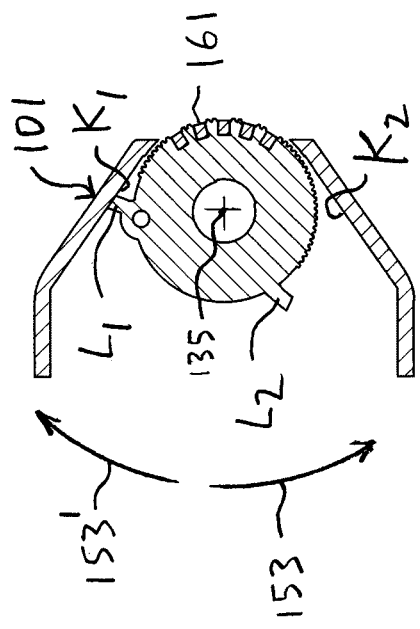
FIG. 2G is a side view of the thumbwheel of the damper control assembly mounted in the front cover element, when the damper control assembly locates the damper in the open position thereof.
Figure 2H:
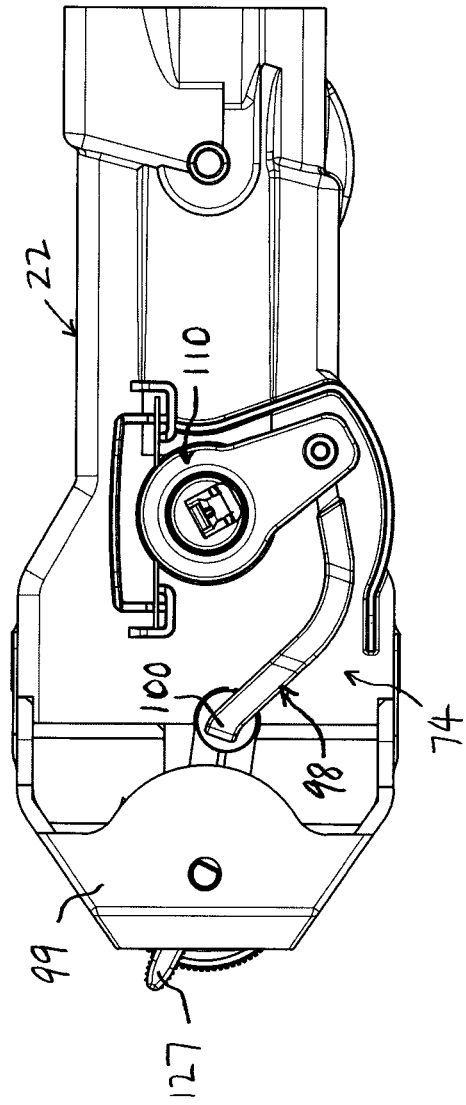
FIG. 2H is a second side view of the ventilation system of FIG. 2A showing an air flow guide control assembly locating the air flow guide in a first position thereof.
Figure 21:
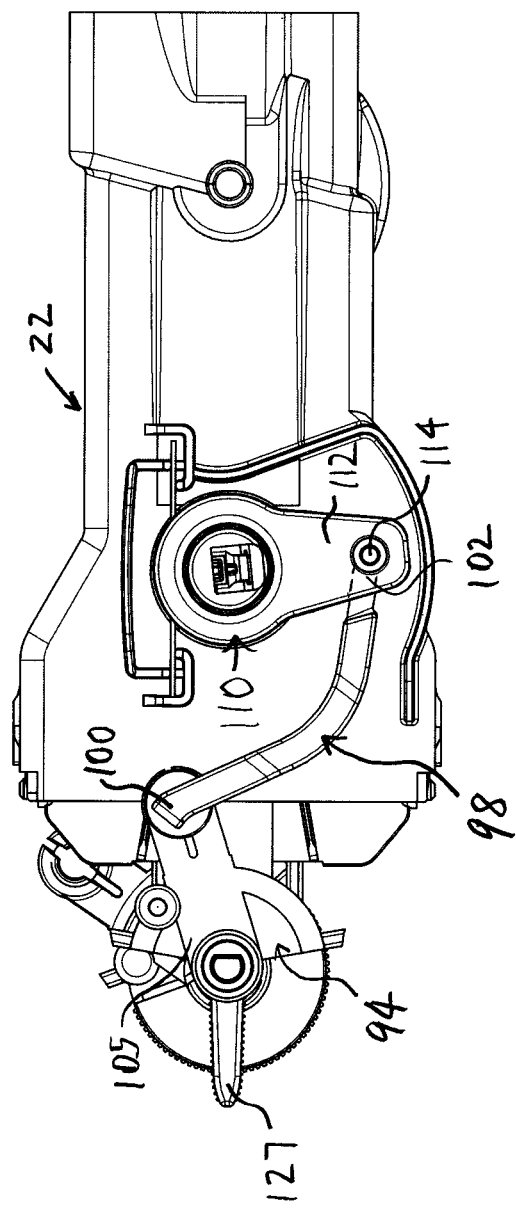

2F). Preferably, the inner end 139 of the damper linkage arm 137 is pivotably connected with the damper control extension 151. As can be seen in FIG. 2G, the second end portion 101 preferably includes first and second parts "$K_1$", "$K_2$" that partially define the second cavity "R". Preferably, the damper control element body 149 includes first and second damper stops "$L_1$", "$L_2$" for engagement thereof with the first and second parts respectively. As will be described, the first damper stop "$L_1$" engages the first part "$K_1$" to locate the damper 90 in the open position thereof, and the second damper stop "$L_2$" engages the second part "$K_2$" thereof to locate the damper 90 in the closed position thereof.

It will be understood that, in FIG. 2E, the damper control assembly 129 is positioned to locate the damper 90 in the open position thereof. In FIG. 2F, the damper control assembly 129 is positioned to locate the damper 90 in the closed position thereof.

For clarity of illustration, in FIG. 2G, the damper control element body 149 is shown with the first damper stop "$L_1$" engaged with the first part "$K_2$" of the second end portion 101. Accordingly, the position of the damper control element body 149 as shown in FIG. 2G is the same as the position of the damper control element body 149 that is illustrated in FIG. 2E.

To cause the damper 90 to pivot about the damper axis 92 from the open position thereof toward the closed position thereof, the user causes the damper control element 133 to pivot about the damper control axis 135 in the direction indicated by arrow 153, as shown in FIGS. 2E and 2G. As can be seen in FIG. 2E, when the damper control element 133 rotates about the axis 135 in the direction indicated by arrow 153, the extension 151 pivots generally downwardly, as indicated by arrow 155. This pivoting movement of the extension 151 pushes the damper linkage arm 137 in the direction indicated by arrow 157, which in turn causes the body 145 of the damper connector 143 to rotate about the damper axis 92, as indicated by arrow 159.

It will be understood that the user may control the extent to which the damper 90 rotates from its open position to its closed position. If the user chooses to rotate the damper control element 133 in the direction indicated by arrow 153 as far as the damper control element 133 can be rotated, such rotation is stopped when the second damper stop "$L_2$" engages the second part "$K_2$". When the damper control element 133 is positioned as illustrated in FIG. 2F, the second damper stop "L" is engaged with the second part "K".

In order to move the damper 90 from its closed position toward its open position, the user rotates the damper control element body 149 in the direction indicated by arrow 153' in FIG. 2F. Such motion of the damper control element body 149 causes the extension 151 to pivot generally upwardly, in the direction indicated by arrow 155' in FIG. 2F. Due to such rotation, the damper linkage arm 137 is pulled in the direction indicated by arrow 157'. This causes the damper connector body 145 to rotate about the damper axis 92 in the direction indicated by arrow 159'.

Based on the foregoing, and as can be seen in FIG. 2G, those skilled in the art would appreciate that if the rotation of the damper control element body 149 in the direction indicated by arrow 153' is continued, such rotation will be stopped when the first damper stop "L" engages the first part "K" (FIG. 2G). When rotation of the damper control element body 153' is stopped by engagement of the first damper stop "L" with the first part "K", the damper 90 is in the open position thereof.

In one embodiment, the damper control element body 149 has an engagement surface 161 formed for frictional engagement with the user's fingers or thumb. Preferably, the second end portion 101 is formed to so that the engagement surface 161 is accessible by the user (FIG. 2G).

It will be understood that the damper control element 133 rotates independently of the rod 125. As can be seen in FIG. 7C, in one embodiment, the damper control axis 135 preferably is coaxial with the control element axis 96. However, and as can be seen in FIGS. 6C and 7C, a second end "N" of the rod 125 that is located proximal to the damper control element 133 is not engaged with or connected with the damper control element 133.

Figure 6C:
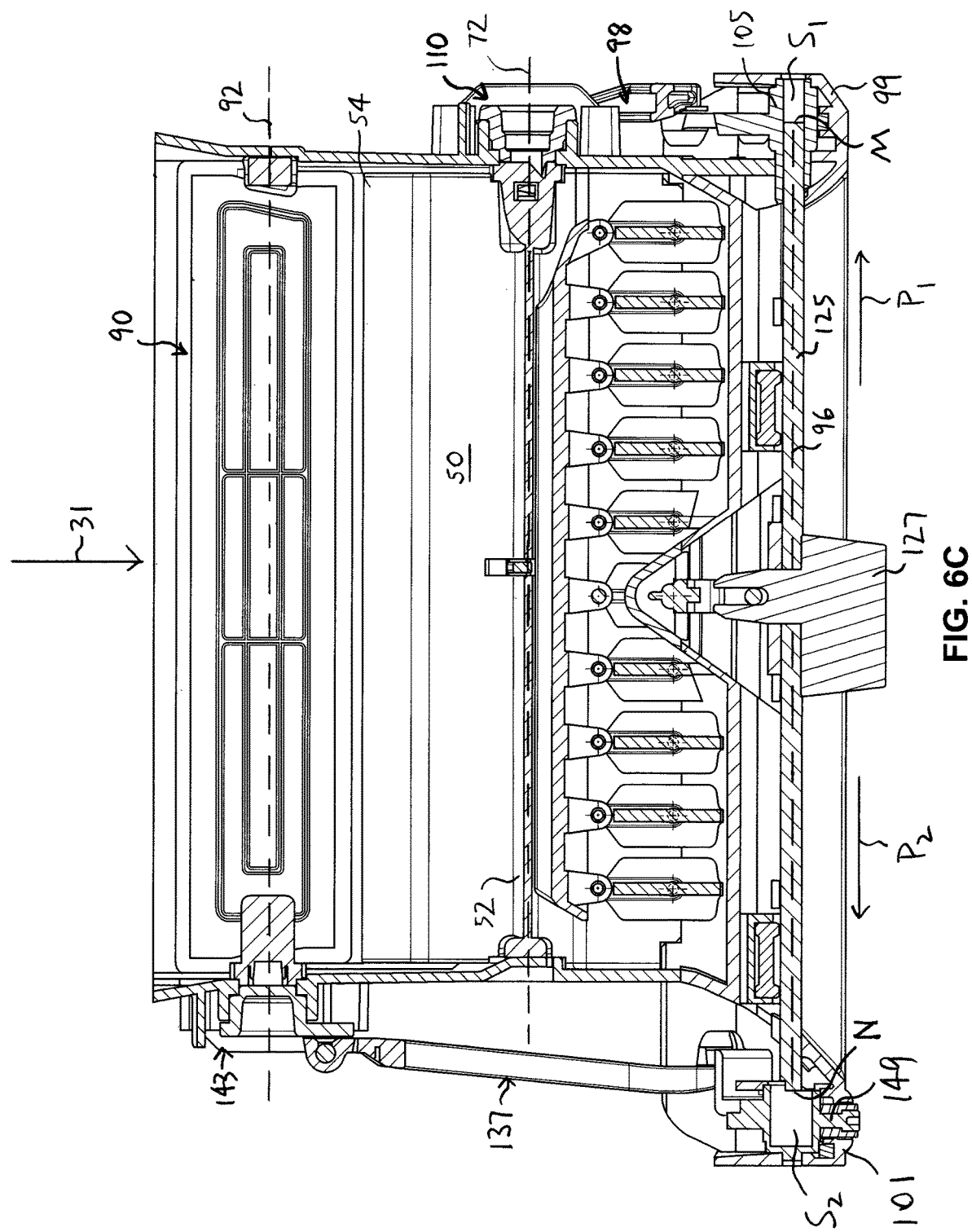
FIG. 6C is another cross-section of the ventilation system of FIG. 1A.

As can be seen in FIG. 6C, the rod 125 extends between a first end "M" thereof and the second end "N" thereof. In each of the first and second end portions 99, 101, spaces "$S_1$", "$S_2$" are provided, to permit axial movement of the rod 125 in the directions indicated by arrows "$P_1$", "$P_2$" in FIG. 6C. As will be described, the rod 125 may be moved in the directions "$P_1$", "$P_2$" in order to cause the cross-car vanes 56 to be positioned as desired.

As described above, rotation of the rod 125 causes corresponding rotation of the control element body 105 about the control element axis 96. It will be understood that the control element body 105 is mounted on the rod 125 so as to permit the axial movement of the rod 125 relative to the control element body 105 without affecting the connection between the rod 125 and the control element body 105. Also, and as noted above, the second end "M" of the rod 125 is not engaged with the damper control element 133, so that rotation of the rod 125 does not affect the damper control element 133. Rotation of the damper control element 133 is independent of rotation of the rod 125.

As noted above, the ventilation system 20 preferably includes the air flow director 76. As can be seen in FIG. 6C, the rod 125 preferably is located in front of the cross-car vanes 56. As noted above, the rod 125 is movable in the first direction (indicated by arrow "$P_1$") and in the second direction (indicated by arrow "$P_2$") relative to the housing. The first and second directions are axial directions of the rod 125, and orthogonal to the vane axes 58 of the cross-car vanes 56 (FIG. 6B).

Preferably, the first and second portions 60, 62 of each of the cross-car vanes 56 extend between a front side 163 proximal to the rod 125, and a rear side 165 thereof proximal to the air flow director 76. It is also preferred that the ventilation system 20 includes a number of rear pivot pins 167 (FIGS. 7A, 8) pivotably connecting the cross-car vanes 56 respectively at the rear sides 165 thereof to the air flow director 76, for pivoting movement of the cross-car vanes 56 about their respective rear pivot pins 167 relative to the air flow director 76, when the air flow director 76 is moved in a selected one of the first and second directions.

As can be seen in FIGS. 6A and 8, the vane axis 58 of each cross-car vane 56 preferably is located between the rear pivot pin 167 and the front side 163 of the cross-car vane 56.

Preferably, the ventilation system 20 includes a cross-car vane control assembly 169 (FIG. 7C), for controlling movement of the cross-car vanes 56. As can be seen in FIG. 7C, the cross-car vane control assembly 169 preferably includes a yoke element 171 that extends from the rod 125 toward a selected one of the cross-car vanes 56.

As can be seen in FIGS. 6A-6C, 7B, 7C, and 8, the yoke 171 is secured to the tab 127 and the rod 125. Preferably, the yoke 171 is centrally located on the rod 125. The selected one of the cross-car vanes is identified by reference character 56', for clarity of illustration.

As noted above, the rod 125 is movable in a selected axial direction, i.e., the rod may be moved in the first axial direction (indicated by arrow "P$_1$"), or the rod 125 may be moved in the second axial direction (indicated by arrow "P$_2$"). The rod 125 may conveniently be moved in an axial direction by the user engaging the tab 127, and moving the tab 127 in the desired direction.

Preferably, the selected cross-car vane 56' includes a central pivot pin 173 (FIGS. 7B, 8) that is aligned with its vane axis 58. As can be seen in FIG. 8, the central pivot pint 173 is secured to the first and second portions 60, 62 of the selected cross-car vane 56'. As can be seen in FIGS. 7B and 7C, the yoke 171 preferably is pivotably connected with a bracket 175, which is included in the cross-car vane control assembly 169. The bracket 175 includes a front part 177 pivotably connected with the yoke 171, and a pin connector 179 connected with a central pivot pin that is aligned with the vane axis 58 of the selected (central) cross-car vane 56' (FIGS. 7C, 8). The front part 177 preferably is located proximal to the rod 125 (FIGS. 7B, 8).

For example, when the yoke 171 is moved in a selected axial direction (in the example shown in FIG. 6B, the first direction (as indicated by arrow "P$_1$")), the front part 177 moves with the yoke 171, causing the pin connector 179 to pivot about the vane axis 58 of the selected cross-car vane 56', causing the central pivot pin 173 to pivot also, which moves the selected cross-car vane 56', causing the selected cross-car vane 56' to pivot about its vane axis 58 in the direction indicated by arrow "T" in FIG. 6B.

In the example illustrated in FIG. 6B, the rotation of the pin connector 179 about the vane axis 58 pivots the selected cross-car vane 56' about its vane axis 58, so that the front side 163 of the selected cross-car vane 56' moves generally in the first direction. When the cross-car vane 56' pivots about its vane axis 58 to move its front side 163 in the first direction, the rear side 165 of the cross-car vane 56' moves as indicated by arrow "T", but the rear side's movement is generally in the second direction.

The movement of the rear side 165 of the selected cross-car vane 56' in the second direction pushes the air flow director 76 in the second direction, as can be seen in FIG. 6B. The lateral movement of the air flow director 76 in the second direction is indicated in FIG. 6B by arrow "U".

Because the other cross-car vanes 56 are pivotably connected to the air flow director 76, movement of the air flow director 76 in the second direction causes corresponding movement of the rear sides 165 of the other cross-car vanes 56 in the second direction. Such movement of the rear sides 165 also causes corresponding movement of the other cross-car vanes 56, and they pivot about their respective vane axes 58 at substantially the same time, so that the front sides 163 of the other cross-car vanes 56 move substantially uniformly in the first direction.

In this way, movement of the tab 127 in the first direction causes corresponding pivoting movement of the front sides 163 of the cross-car vanes 56 (including the selected cross-car vane 56') substantially in unison. It will be understood that, when the rod 125 instead is moved in the second direction, the front sides 163 of the cross-car vanes 56 are correspondingly pivoted, substantially in unison, in the second direction. The effects of a movement of the rod 125 in the second direction are outlined in ghost outline in FIG. 6B, for clarity of illustration.

From the foregoing, it can be seen that when the front side 163 of the cross-car vane 56' pivots about its vane axis 58, the rear side 165 of the cross-car vane 56' moves the same distance as the front side 163, but in the opposite direction.

As illustrated in FIG. 6C, when the front side 163 of the cross-car vane 56' is moved in the direction indicated by arrow "P$_1$", the rear side 165 of the cross-car vane 165 is moved by the same distance in the direction indicated by arrow "P$_2$".

The initial air flow direction is indicated by arrow 31. From the foregoing, it can be seen that the cross-car vanes 56 may be pivoted about their respective vane axes 58 together, and simultaneously, to direct the air flowing through the housing 22 in any selected direction relative to the initial air flow direction. For example, the cross-car vanes 56 may be positioned to direct air flowing through the first and second channels 40, 42 in the initial air flow direction or in directions parallel to the initial air flow direction (FIGS. 6A, 6C), or in directions that diverge from the initial air flow direction (FIG. 6B).

As illustrated in FIG. 6A, for example, the cross-car vanes 56 direct the air flowing out of the outlet opening 84 in directions the same as, or parallel to, the initial air flow direction. In FIG. 6B, the front sides 163 of the cross-car vanes 56 have been pivoted in the direction indicated by "P", so that the air flowing through the housing 22 is directed by each of the cross-car vanes generally toward the right, as illustrated in FIG. 6B. For example, air flowing between the cross-car vanes identified in FIG. 6B by reference characters 56$_A$ and 56$_B$ for convenience is direct by them in the direction indicated by arrow "X" in FIG. 6B. Accordingly, when the cross-car vanes 56 are pivoted toward one direction or the other (i.e., toward the first direction or the second direction, as the case may be), the air exiting the housing is directed in a direction that diverges from the initial air flow direction. It will be understood that the cross-car vanes may be positioned in any positions between the extreme positions illustrated in FIG. 6B. (In FIG. 6B, the cross-car vanes are shown in solid outline positioned toward "P$_1$" as far as possible, and the cross-car vanes are shown in ghost or dashed outlined positioned toward "P$_2$" as far as possible.)

The first and second projections 68, 70 included in each cross-car vane 56 serve to direct air flowing past the first and second directions 68, 70 through the first and second channels 40, 42, as well as directing the air flowing past them in a selected direction relative to the initial air flow direction.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:
1. A ventilation system comprising:
a housing extending between an inlet end at a rear side of the housing, into which a volume of air is directed in an initial air flow direction, and an outlet end at a front side of the housing, the inlet end and the outlet end defining a central plane of the housing;
the housing comprising:
an outlet portion comprising first and second outer elements spaced apart from each other to partially define respective first and second channels for guiding the volume of air to the outlet end;
an inlet portion located between the inlet end and the first and second channels, the inlet portion comprising at least one inlet portion wall defining an inlet channel in fluid communication with the first and second channels;

an air flow guide extending between a base portion and a tip thereof, the air flow guide being movable between a first position, in which the tip is located at a predetermined first minimum distance from said at least one inlet portion wall and the air flow guide directs a first major portion of the volume of the air flowing through the inlet channel into the first channel, and a second position, in which the tip of the air flow guide is located at a predetermined second minimum distance from said at least one inlet portion wall and the air flow guide directs a second major portion of the volume of the air flowing through the inlet channel into the second channel, the air flow guide being pivotable between the first and second positions about an air flow guide axis through the base portion of the air flow guide;

a plurality of cross-car vanes mounted between the first and second outer elements and pivotable about respective vane axes thereof located orthogonal to the initial air flow direction, for directing the volume of air flowing through the first and second channels in a selected direction relative to the initial air flow direction;

each said cross-car vane comprising a first portion partially located in the first channel and a second portion partially located in the second channel;

the first and second portions comprising respective first portion and second portion bodies and respective first and second projections that project from the first portion and second portion bodies respectively;

the first projection being spaced apart from the first outer element to at least partially define the first channel and the second projection being spaced apart from the second outer element to at least partially define the second channel;

an air flow guide control assembly, comprising:
  a control element, rotatable about a control element axis thereof, the control element comprising a control element body and a first extension portion extending from the control element body to an output end thereof;
  an air flow guide linkage arm, extending between inner and outer ends thereof;
  the first extension portion being pivotably connected with the inner end of air flow guide linkage arm at the output end of the first extension portion;
  an air flow guide connector comprising a connector body that is secured to the air flow guide, the air flow guide connector comprising a second extension portion thereof extending from the connector body; and
  the air flow guide linkage arm being pivotably connected at its outer end with the elongate portion of the air flow guide connector,
  wherein rotation of the control element about the control element axis causes corresponding rotation of the air flow guide about the air flow guide axis.

2. A ventilation system according to claim 1 in which the control element comprises a rod defined by the control element axis and a tab mounted to the rod, wherein movement of the tab about the control element axis causes corresponding rotation of the rod about the control element axis.

3. A ventilation system according to claim 2 in which:
the housing comprises a front cover element at least partially defining the front side of the housing;
the front cover element extends between first and second end portions thereof;
the front cover element comprises an opening located between the first and second end portions, the opening being aligned with the outlet opening; and
the first end portion defines a first cavity therein in which the control element is a least partially located.

4. A ventilation system according to claim 3 in which:
the first cavity is at least partially defined by first and second internal surfaces;
the control element body comprises first and second stops formed to engage the first and second internal surfaces respectively;
the first stop engages the first internal surface to locate the air flow guide in the first position thereof, in which the tip is spaced apart from the inlet portion wall by the predetermined first minimum distance; and
the second stop engages the second internal surface to locate the air flow guide in the second position thereof, in which the tip is spaced apart from the inlet portion wall by the predetermined second minimum distance.

5. A ventilation system according to claim 1 comprising a damper positioned between the inlet end and the air flow guide, the damper being movable between an open position, in which the volume of air is flowable through the inlet portion, and a closed position, in which the damper is positioned to resist flow of the volume of air through the inlet portion, the damper being rotatable about a damper axis thereof between the closed and open positions;
the ventilation system additionally comprising a damper control assembly, comprising:
  a damper control element, rotatable about a damper control axis thereof;
  a damper linkage arm, extending between inner and outer ends thereof;
  a damper connector secured to the damper, the damper connector comprising a damper connector body and an elongate portion thereof extending from the damper connector body;
  the outer end of the damper linkage arm being pivotably connected with the damper control element, and the inner end of the damper linkage arm being pivotably connected with the damper connector at the elongate portion thereof,
wherein rotation of the damper control element about the damper control axis causes corresponding rotation of the damper about the damper axis.

6. A ventilation system according to claim 5 in which:
the second end portion of the front cover element defines a second cavity therein; and
the damper control element is at least partially located in the second cavity.

7. A ventilation system according to claim 6 in which:
the second end portion comprises first and second parts that partially define the second cavity;
the damper control element comprises a damper control element body;
the damper control element body comprises first and second damper stops for engagement thereof with the first and second parts respectively;
the first damper stop engages the first part to locate the damper in the open position thereof; and
the second damper stop engages the second part to locate the damper in the closed position thereof.

8. A ventilation system according to claim 2 additionally comprising:
  an air flow director located at least partially between the base portion of the air flow guide and the first and second projections of the first and second portions, for partially directing the volume of air into the first and second channels;

the rod being located in front of the cross-car vanes, the rod being movable in a first direction and in a second direction orthogonal to the vane axes of the cross-car vanes relative to the housing;

the first and second portions of each said cross-car vane extending between a front side thereof proximal to the rod, and a rear side thereof proximal to the air flow director;

a plurality of rear pivot pins pivotably connecting the cross-car vanes respectively at the rear sides thereof to the air flow director, for pivoting movement of the cross-car vanes about their respective rear pivot pins relative to the air flow director when the air flow director is moved in a selected one of the first and second directions; and the vane axis of each said cross-car vane being located between the rear pivot pin thereof and the front side thereof.

9. A ventilation system according to claim 8 additionally comprising a cross-car vane control assembly, comprising:

a yoke element secured to the rod and extending toward a selected one of the cross-car vanes, the selected one of the cross-car vanes comprising a central pivot pin aligned with the vane axis thereof;

the cross-car vane control assembly comprising a bracket with a front part with which the yoke is pivotably connected, the bracket comprising a pin connector connected with the central pivot pin, wherein movement of the rod in a selected axial direction thereof causes corresponding movement of the yoke, and rotation of the pin connector about the vane axis to pivot the selected cross-car vane about the vane axis to move the front side thereof in the selected axial direction and to move the rear side thereof in an opposite direction, to push the air flow director in the opposite direction, the movement of the air flow director in the opposite direction causing corresponding movement of rear sides of the cross-car vanes other than the selected cross-car vane, wherein the cross-car vanes, other than the selected cross-car vane, are pivoted about their respective vane axes, to pivot the front sides of the cross-car vanes other than the selected cross-car vane in the selected axial direction.

* * * * *